United States Patent Office 3,503,048
Patented Mar. 24, 1970

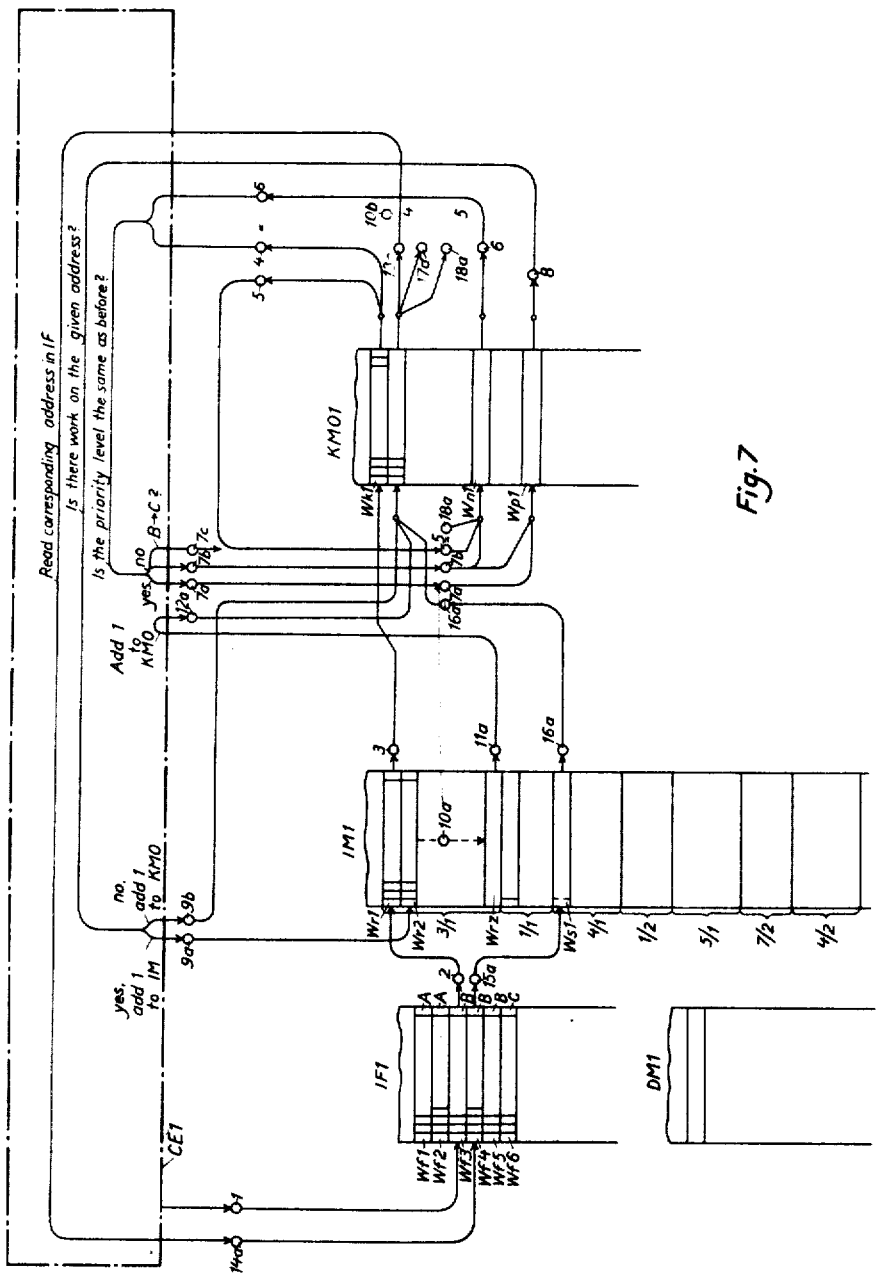

3,503,048
ARRANGEMENT IN COMPUTERS FOR CONTROLLING A PLANT CONSISTING OF A PLURALITY OF COOPERATING MEANS
Oleg Avsan, Huddinge, Goran Anders Henrik Hemdal, Tyreso, Torbjorn Konrad Johnson, Alvsjo, Lars-Olof Noren, Huddinge, and Åke Bertil Fredrik Svensson, Hagersten, Sweden, assignors to Telefonaktiebolaget L M Ericsson, Stockholm, Sweden, a corporation of Sweden
Filed Feb. 23, 1967, Ser. No. 618,193
Claims priority, application Sweden, Mar. 25, 1966, 3,972/66
Int. Cl. G02b 27/14
U.S. Cl. 340—172.5
3 Claims

ABSTRACT OF THE DISCLOSURE

A telephone system is controlled by a system of redundant pairs of computers. Each computer comprises a central processing unit, an instruction memory unit, a working memory unit and a transfer unit for interfacing with the telephone system. The units are only temporarily assigned to cooperate with each other to form the computers and can be arbitrarily switched to different configurations under a supervisory program. Each pair of computers can perform the entire program sequence of control but each pair is assigned a different section of the program sequence. If faults are detected when one pair of computers is performing its section, another pair is automatically assigned to take over.

Figure 1:
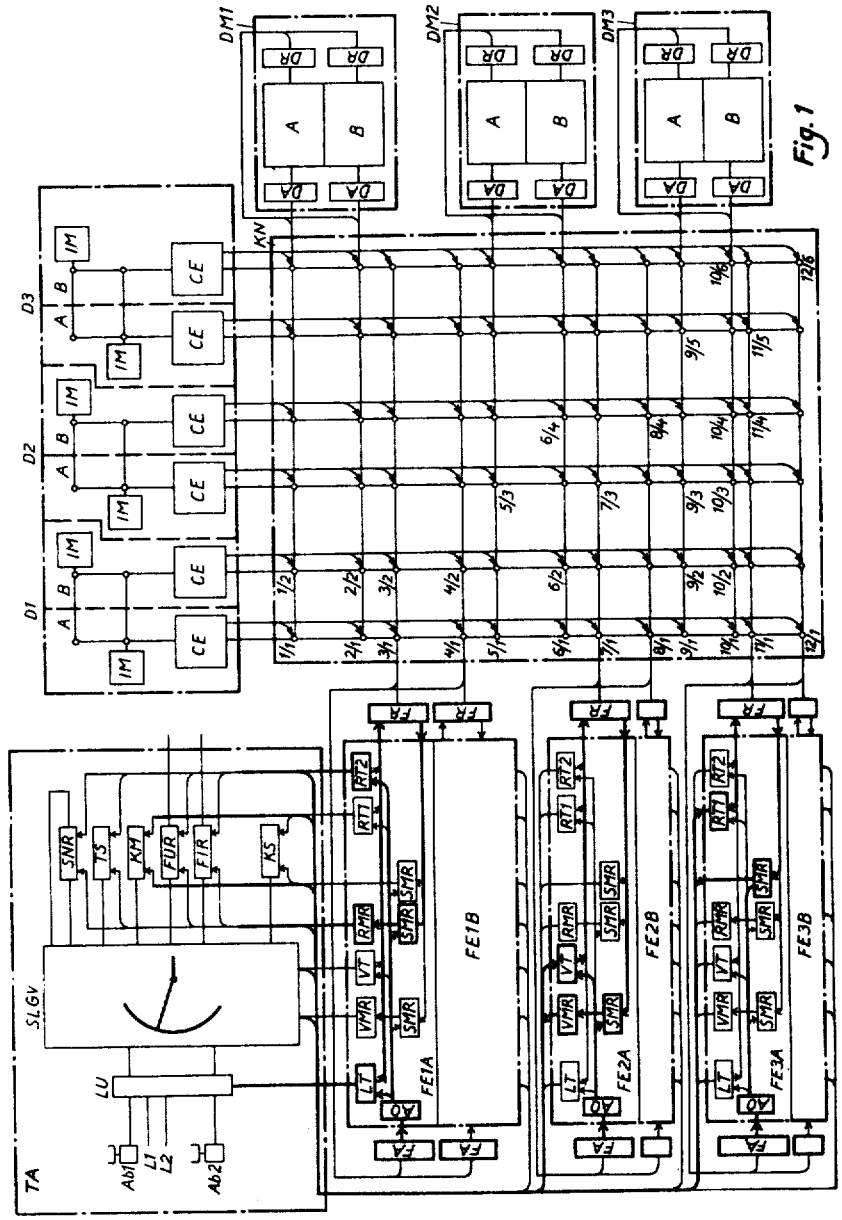

The present invention concerns a computer arrangement for controlling a system of plant consisting of a plurality of cooperating means, e.g. an automatic telecommunication plant including central units for carrying out calculation operations, memory units for the storing of instructions, and memory units for storing of information during the carrying out of the calculation operations. These units co-operate with each other in such a way that each one of the mentioned units, in cooperation with one unit of the remaining categories, forms a computer so that the computers formed in this way, by means of at least one transfer unit on the one hand detects the state of the different means of the telecommunication plant and on the other hand operates these means with the guidance of the result received from the computers.

In a computer controlled plant, e.g. an automatic telecommunication plant where one computer is not sufficient to carry out the tasks in a satisfying way a conceivable solution is that a number of cooperating computers corresponding to the required traffic handling capacity is used, the plant being divided into independent subunits which are served each by its own computer. In establishing a connection between two different means associated with independent subunits in such an arrangement it is, however, necessary to carry out a number of information exchanges and comparisons between the calculation results of the respective computers in order to permit the selection and the establishing of a connection between said two means. This involves, consequently, an additional load on the computers and the plant will function as a plant consisting of a number of different independent telecommunication exchanges. A further consequence will be that for the same traffic volume a greater number of means will be necessary than in a telecommunication exchange which works as one unit.

An object of the invention is to eliminate the mentioned inconvenience and to divide up the work between the computers in a telecommunication plant consisting of a plurality of computers in such a way that every computer carries out certain definite functions for the whole plant so that the information exchange between the different computer is simplified to a great extent.

The arrangement for controlling a plant, e.g. an automatic telecommunication plant, is in the main characterized in that it includes means by means of which every unit of the arrangement can receive information from a plurality of units alternatingly so that the momentarily cooperating units form computers existing only during the time of cooperation while at another time a unit included in such a computer together with other units forms another momentarily existing computer.

According to another characteristic of the invention the instruction memory associated with each one of the computers is arranged for storing all the instructions by means of which a computer can carry out all the functions necessary for controlling the plant but the work between the different computers is divided up in such a way that certain sections of the whole instruction sequence are carried out by one definite computer. Associated with every computer is an indicating memory field from which the respective computer, after carrying out every section of instructions, fetches information concerning the address of the section which shall be carried out next. There is also associated with every computer a memory field with a sequence of supervisory instructions by means of which a computer, upon the receiving of an information implying that a state of operation exists which is defined as anomalous (e.g. fault of circuit, overload), can erase at least one section address in the indicating memory field for a computer which produced the information concerning the fault and can as necessary write this section address into the indicating memory field of another arbitrary computer.

Figure 2:
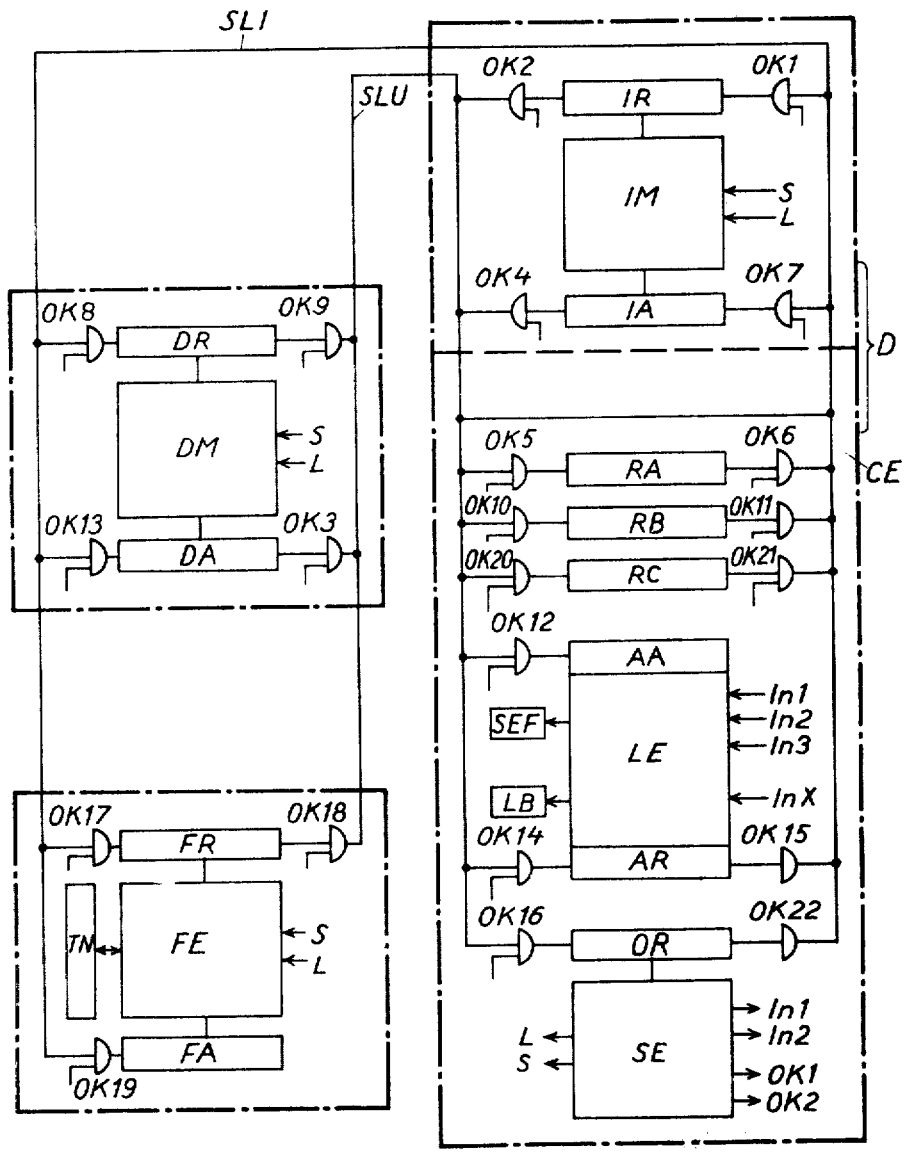
Figure 3:
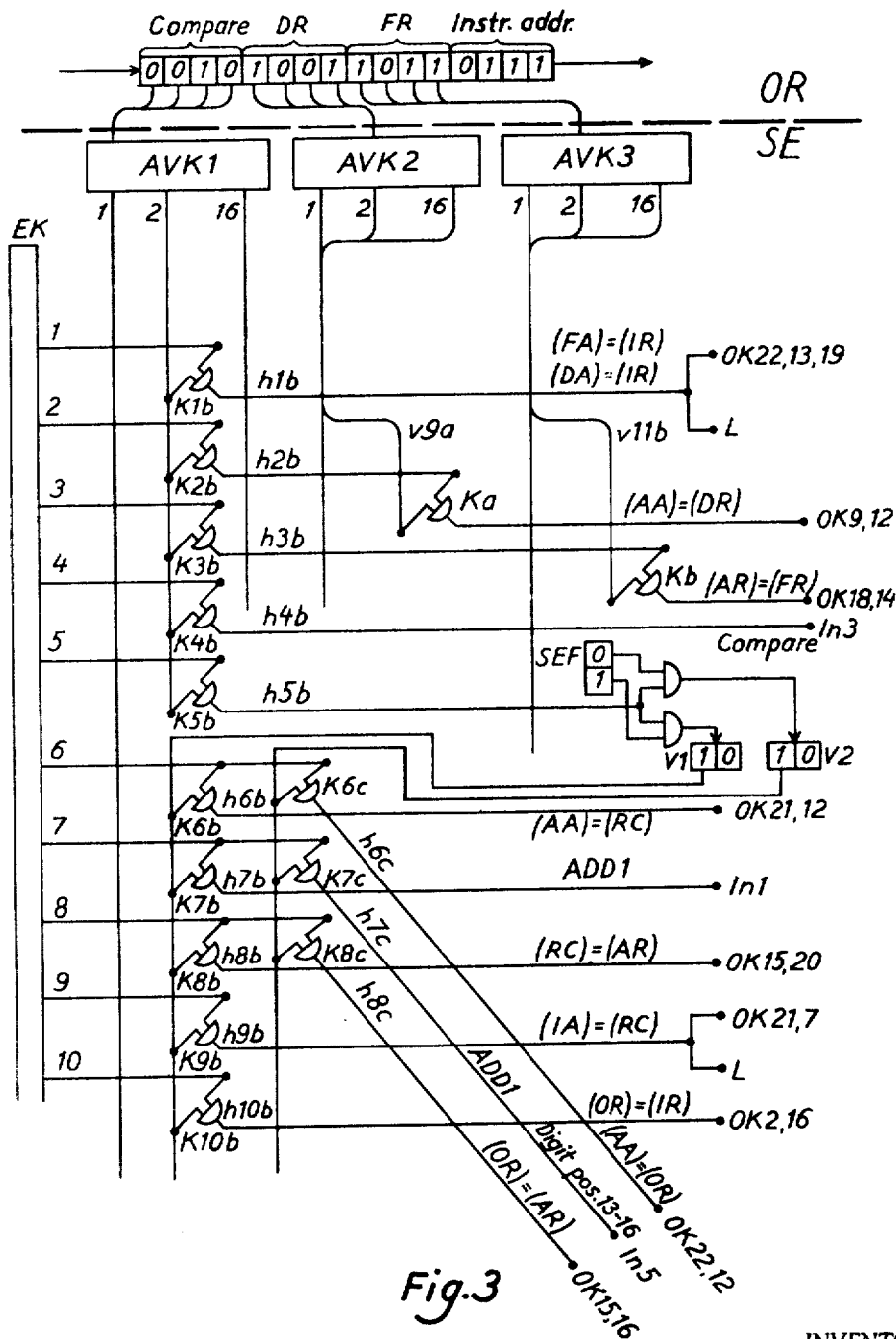
Figure 4A:
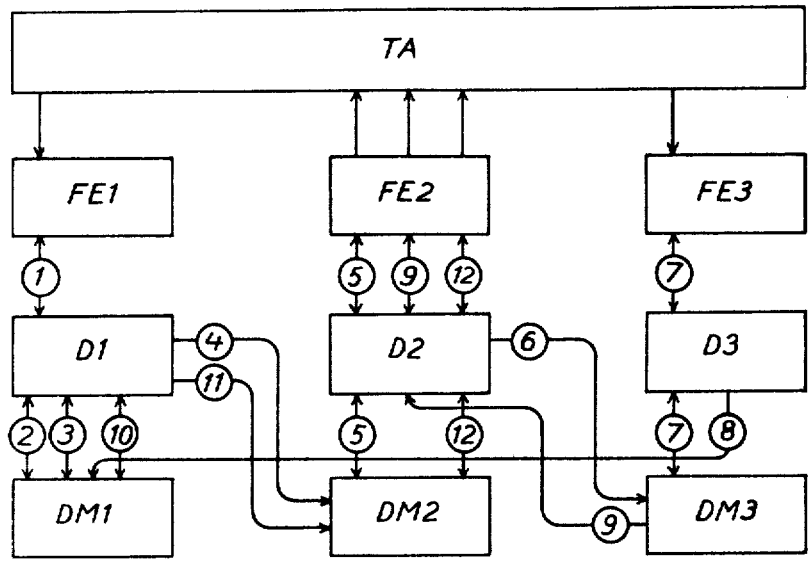
Figure 4B:
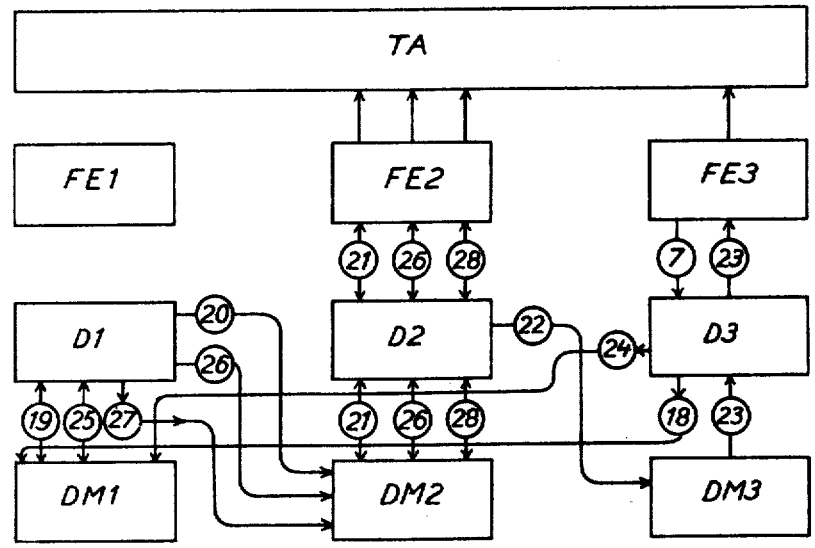
Figure 5:
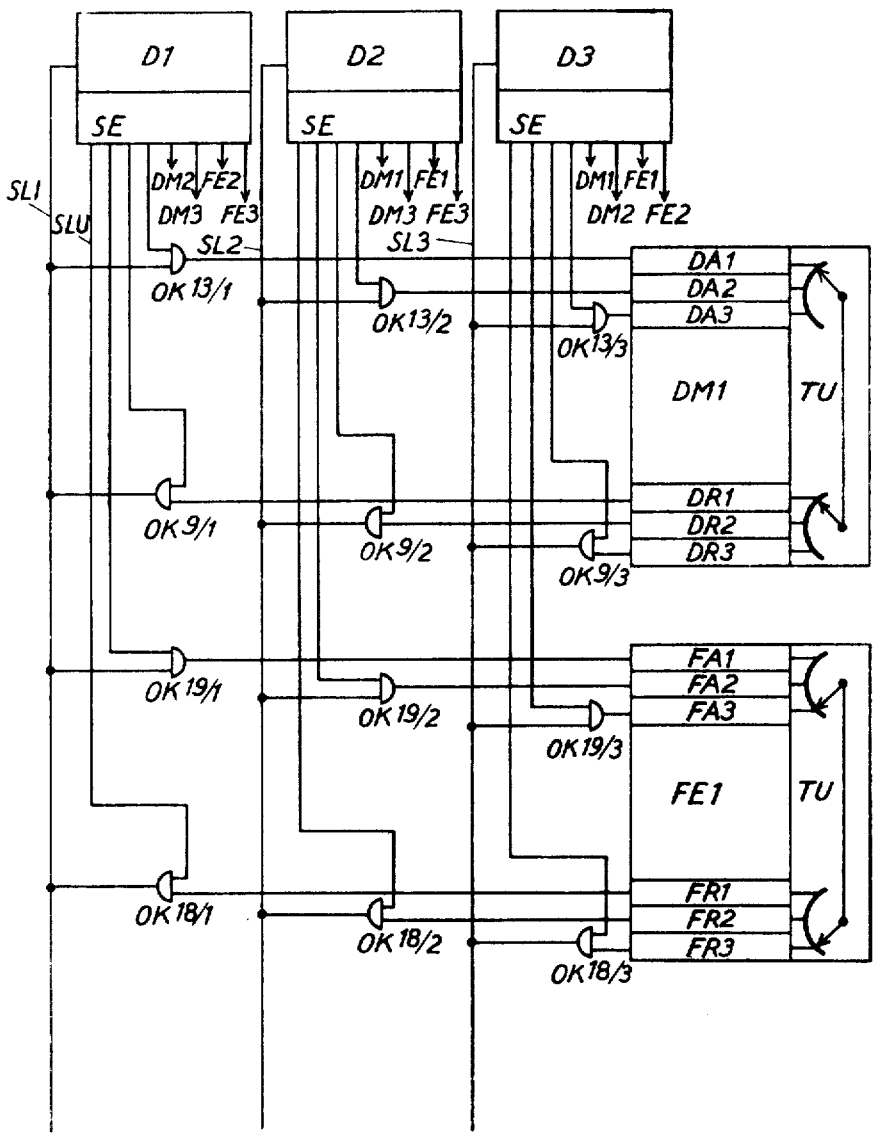
Figure 6:
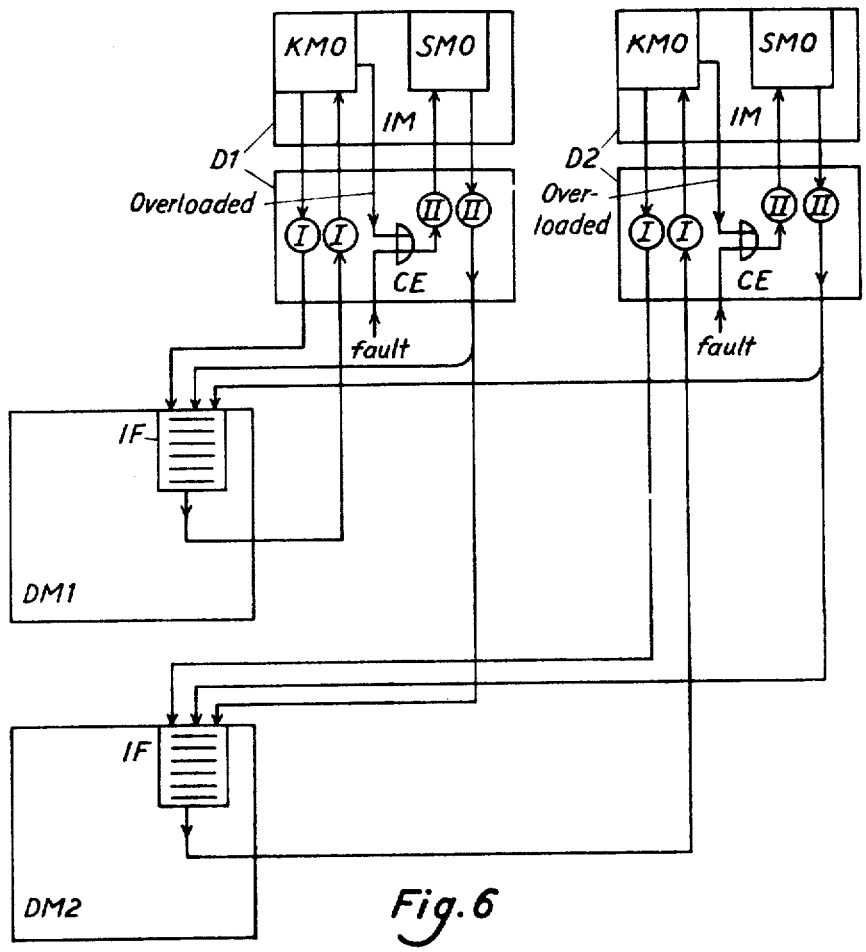
Figure 8:
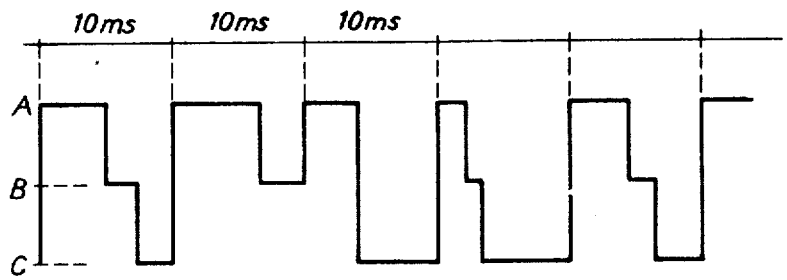
Figure 9:
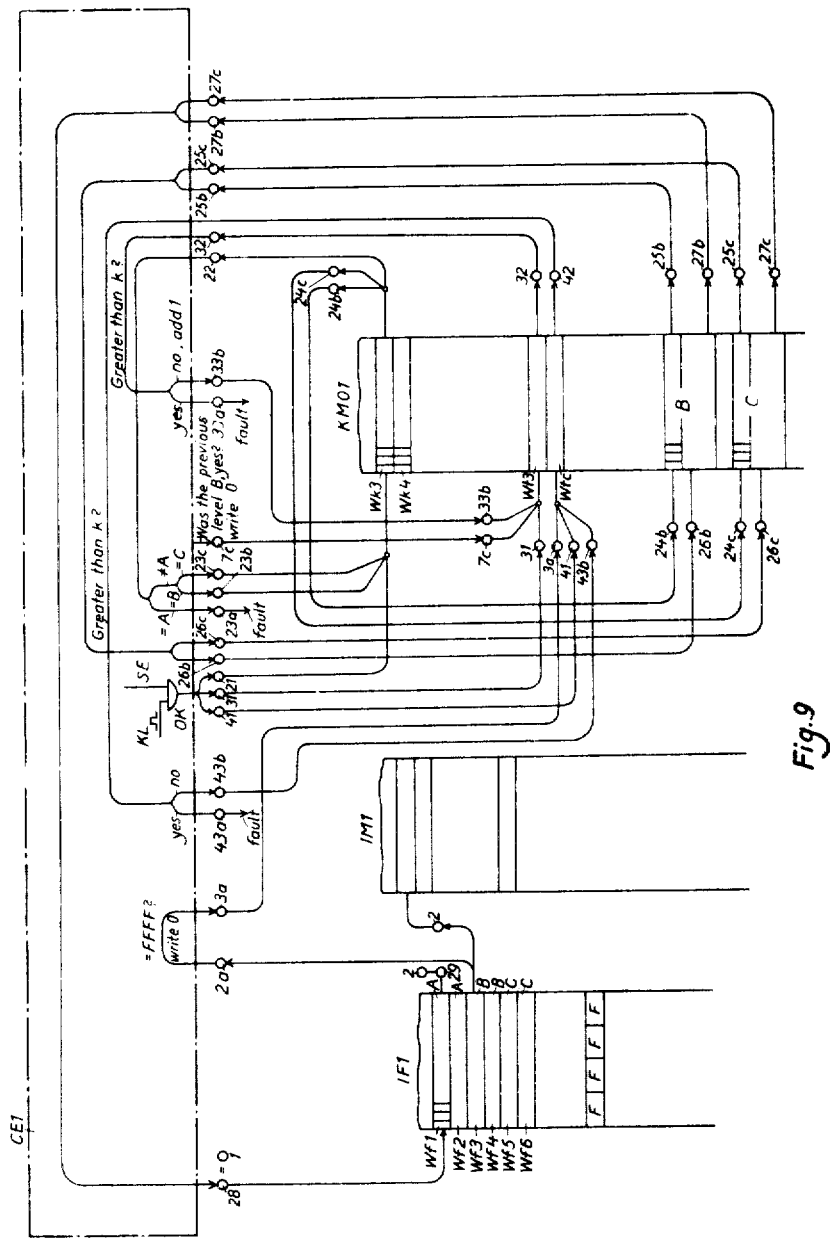
Figure 10:
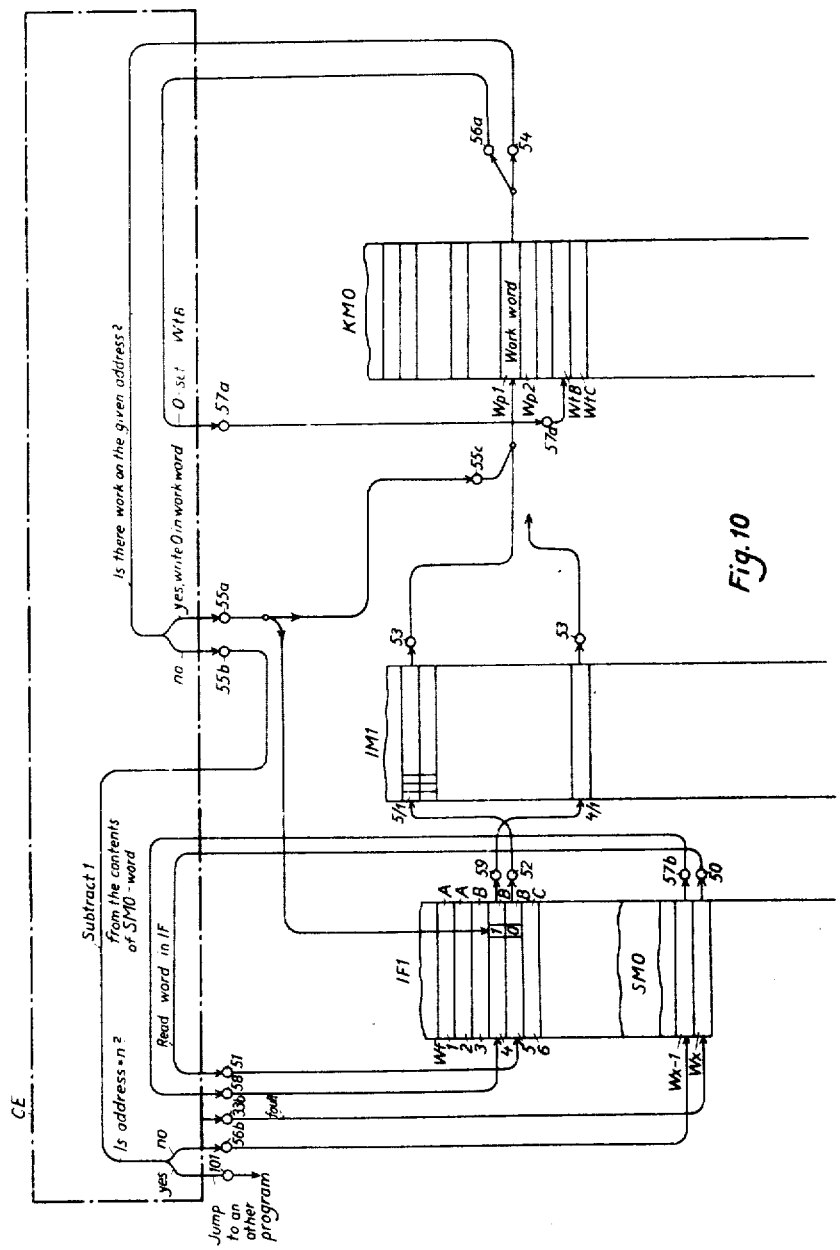
Figure 11:
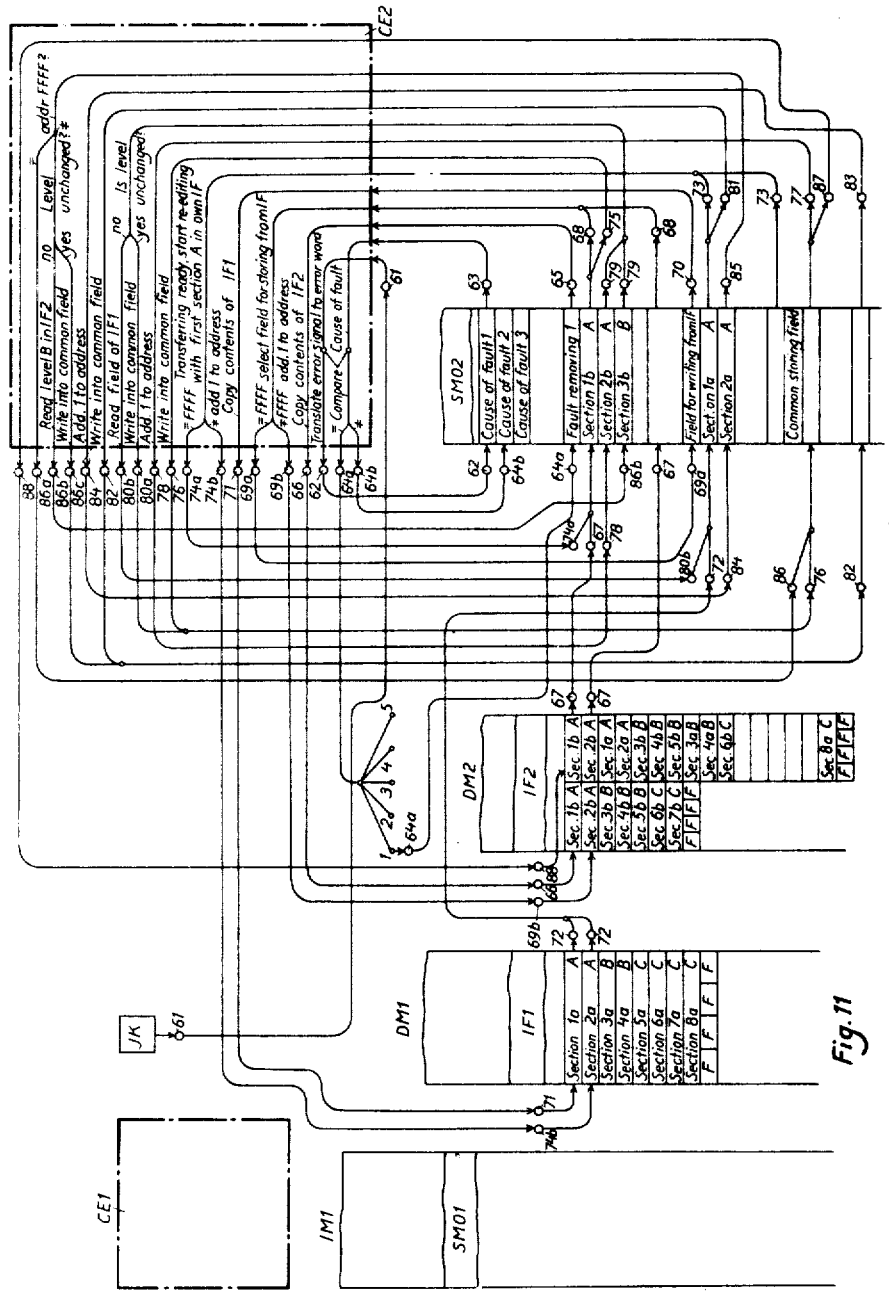
Figure 12:
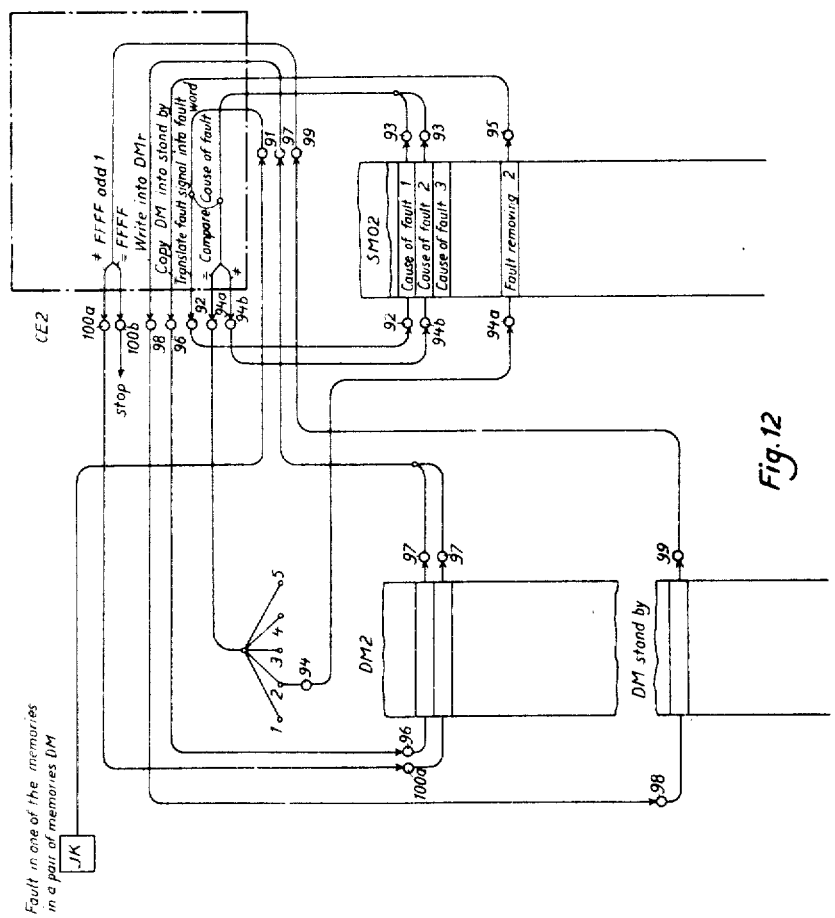
Figure 13:
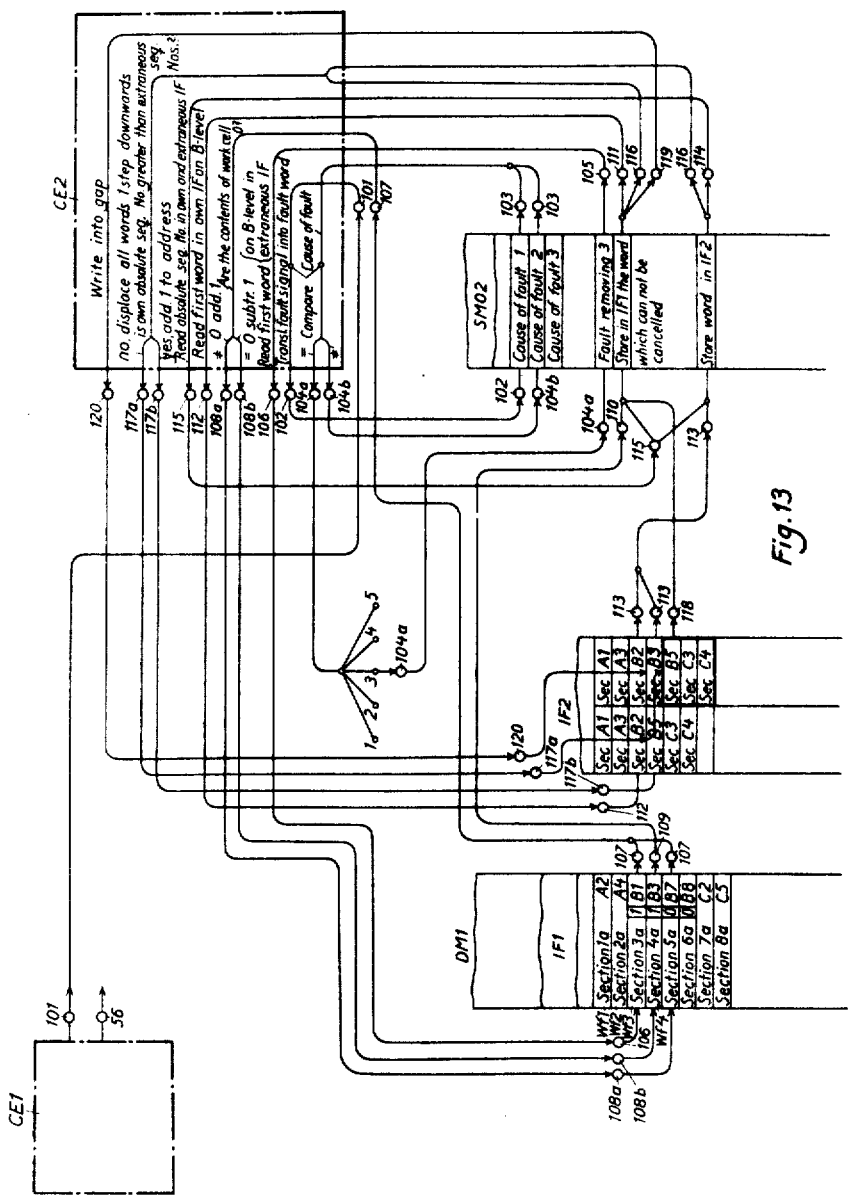

The invention will be explained more in detail with reference to the accompanying drawing in which FIG. 1 is a block diagram of a system for controlling an automatic telecommunication plant according to the invention, FIG. 2 is a block diagram of a computer formed by the units included in the system, FIG. 3 shows diagrammatically the control unit of one of the central units included in the system, FIGS. 4a and 4b show the co-operation between the units included in the system, FIG. 5 shows diagrammatically how the sequence order between the different units is obtained, FIG. 6 shows diagrammatically the cooperation between the working lists and control programs of the computers, FIG. 7 shows diagrammatically the function of the computer supervisory program, FIG. 8 shows diagrammatically the work distribution between the different priority levels, at an arbitrary moment, FIG. 9 shows diagrammatically the function of the computer supervisory program in connection with the clock controlled interruption, FIG. 10 shows diagrammatically the function of the system supervisory program upon overload, FIG. 11 shows diagrammatically the function of the system supervisory program upon transporting the work of one computer to another one, FIG. 12 shows the function of the system supervisory program upon a fault in a data memory unit, and FIG. 13 shows the function of the system supervisory program upon transporting a part of the work of one of the computers to another computer.

In FIG. 1 there is shown a telephone plant TA which is controlled by means of a computer system. This system includes a number of central units CE (central processing units), instruction memories IM (instruction memory units), data memories DM (working memory units) and transfer units FE which can feed information to and receive information from each other as symbolically indicated by a connection network KN. The number of units is not necessarily the same in the respective groups. In this way a central unit CE, e.g., at a definite time can feed information to and receive information from a definite data memory DM1 while at another time it can feed information to and receive information from another data memory DM2. The momentarily cooperating units can be regarded to form a computer during the time of cooperation but at another time one or more of the mentioned units can be part of another computer as will be explained in the following. As a principle an arbitrary unit should be able to cooperate with an arbitrary unit but according to the embodiment it is supposed that a definite instruction memory IM as a rule cooperates with a definite central unit CE and for the sake of simplicity is called together with this unit a calculation unit D. All the units, the calculation units D1–D3 as well as the memory units DM1–DM3 are suitably doubled and work in parallel to obtain an effective control and operation stability, the result obtained from the parallelly working units being continuously compared in order to determine in known manner upon a deviation that a fault exists. In regard to the fact that the functions of the doubled units are identical for the sake of simplicity e.g. D1A and D1B are not mentioned individually in the following but only D1 and similarly not DM2A and DM2B but only DM2. If, consequently, it is mentioned that, e.g., the calculation unit D2 and the data memory DM1 momentarily form a computer two parallelly working computers are concerned. In these computers the instruction memory IM contains the instruction list or the instruction sequences, the central unit CE carries out the calculation operations ordered by the instructions and the data memory DM stores temporarily the information necessary for the carrying out of the calculation operations in a way known per se.

The computers formed in the described way receive information concerning the identity of the subscribers and of the switching means together with the information about their busy or idle condition in the form of binary words. In accordance with this information they select a switching path in which all the switching means are idle and operate thereafter all the means included in the switching path by sending control orders in the form of binary words. Thus there are on the one hand binary information words concerning, e.g., the condition of the lines and relays which words are fed to the calculation units and on the other hand binary information words which words are fed from the calculation units to the telephone exchange to operate the switching means. This can take place in both directions in the form of, e.g., 16 digit binary words.

The telephone plant TA can be of an arbitrary type. It includes, according to FIG. 1 a switching network SLGV to which a number of lines L1, L2 and subscribers A$b$1, A$b$2 respectively are connectable via line equipment LU. Connection between the different lines and subscribers respectively takes place by means of connection means with different functions, e.g., link circuit relay sets SNR for connection of local calls, tone senders TS for sending tone frequency signals to the subscribers, code receivers KM for receiving digit signals, code senders KS for sending digit selecting signals to a code receiver in another exchange, incoming line repeaters FIR and outgoing line repeaters FUR.

Because of the great difference in operating speed of the computers with which the binary words are produced which operate the switching means and the operating speed of relays and selectors transfer means FE1–FE3 are necessary which store the information received from the computers until the more slowly operating means have been activated and which store the condition information received from the telephone plant until this information is fed to the computer as it will be described later on. The binary words which contain information concerning the condition of the switching means and the binary words which contain information with respect to which switching means are to be operated, respectively, do not necessarily concern individual means but can concern groups of means (subscribers' equipments, selectors, etc.), according to the embodiment 16 means, in which words the idle condition of a means is represented, e.g. by binary 0 while the occupied state is represented by binary 1. In a similar way binary 1 can signify that the switching means which corresponds to the respective digit position in the word received from the computer is to be operated while those means the corresponding digit position of which is binary 0 shall not be operated in the respective 16-group. To be able to find the 16-group from which a test instruction shall be received and to which an operation instruction shall be sent, respectively, an address information is necessary, for which purpose likewise a word containing 16 binary digits is used.

To be able to carry out both functions, i.e., to cooperate with the relatively slow electromechanical switching means in the telecommunication plant as well as with the considerably faster computer units, the transfer units FE1–FE3 have two buffer registers; an address register FA and a result register FR which registers can store the high speed information received from the computers and retransport it to those parts which operate the relays and the selectors. This is shown in FIG. 1 as the transfer units FE1–FE3. Of safety purpose even the transfer units are doubled. The address register FA as well as the result register FR in each one of the transfer units can each, via its 16-wire conductor via the switching network KN, be connected to one or another of the computers. The first mentioned register receives from this computer the calculated address in the form of a 16-digit binary word and the last mentioned register receives from the computer the calculated operation information in the form of a 16-digit binary word or alternatively receives from the transfer unit information about the condition detected in the telephone plant. SMR indicates fast relay operation units which store the information words received in rapid sequence from the computer unit via the result register FR until these information words have operated, e.g., relays or selectors. VMR indicates a selector operating relay set, and RMR indicates a relay operating relay set which both receive their operating signals from unit SMR. Even those means send leave information to their computer concerning the state: a line test device LT, a selector test device VT and relay test devices RT1, RT2. These three last mentioned types of means do not need any transfer means in the direction of the computer due to the difference in operating speed since the sensing can take place in the speed determined by the computer. The transfer unit includes a decoding device AO which converts the binary address information received from the computer to positional information.

The functions of the telephone plant can be divided in such a way that the calculation units D1–D3, or more exactly the computers temporarily formed of those and of the data memories DM1–DM3, are utilized in about the same degree. According to the embodiment, it is assumed that the calculation unit D1 carries out the sensing of lines to determine the state of the lines by means of the line test device LT, operation of the selectors by means of the selector operating device VMR and the operating of certain slow relays by means of the relay operation unit RMR. The calculation unit D2 carries out the sensing of the state of the selectors by means of the selector test device VT, it operates certain relay functions by means of the relay operation units RMR and detects the state of a number of relays by means of the units RT1, RT2. The calculation unit D3 carries out the receiving, analysis and sending of digits by means of the units RT1 and SMR. It should be pointed out that all the transfer units normally carry out the same functions but to make the description more clear it has been assumed in FIG. 1 that the transfer units FE1A, FE1B . . . FE3B are substantially specialized in certain functions which correspond to the functions of the calculation units.

To explain the function of the system a concise description is first made of a computer unit formed by a calculation unit D, a data memory DM and a transfer unit FE for performing the operations necessary for controlling an automatic telephone exchange and which computer unit is not shown in its doubled or redundant form for the sake of clarity. As mentioned above the calculation unit D includes on the one hand a central unit CE which in its turn includes a number of registers RA, RB, RC, a logical unit LE and a control unit SE for a microprogram (see FIG. 2), on the other hand the instruction memory IM in which the instructions to be carried out by the computer are stored, each, in its definite address in the form of, e.g., 16-digit binary words. These instructions are read out sequentially or in another sequence prescribed by the program and each instruction implies the carrying out of a number of definite operations which are associated with this instruction and are determined by the microprogram of the computer. The microprogram can imply reading out and writing of information in the different means, transport of information from one means to another one, carrying out of logical operations in the logical unit, etc., in a sequence and in a number of stages defined by the special instruction. Associated with the instruction memory IM is an address register IA in which the address is written in which the intended instruction is to be found in the instruction memory, and an instruction register IR to which an instruction, selected by means of the address register IA, can be transferred from the instruction memory for forwarding to the remaining means. Alternatively an instruction can be fed from an outer means to the instruction register IR and simultaneously an address into which the instruction shall be located in the instruction memory IM is fed to the address register IA. The last mentioned process does normally not take place during the normal function of the computer but only upon a change of the program while during the normal operation only reading out takes place. The possibility of writing as well as reading out is symbolized by the letters S and L in the block diagram in FIG. 2.

In FIG. 2 only one transfer unit FE and one data memory DM are indicated although, as it has been mentioned above and as it will be described later on, every calculation unit can alternatingly cooperate with different transfer units and data memories in a system according to the invention.

The central unit CE includes according to the embodiment three registers RA, RB, RC (FIG. 2) into each of which a 16-digit binary word can be written, be stored there and fed out from there. An essential part is the logical unit LE which can carry out different arithmetic operations, e.g. addition, subtraction, comparison, logic exclusive or-functions. The logical unit LE is supplied by an input register AA and a result register AR for the recording of one of two operands, the result of addition or subtraction being obtained in the result register in such a way that the binary word written into the last mentioned register is changed to the calculation result. At logical comparison operations an indication is obtained from an indicator, e.g. an indicating flip-flop which upon conformity indicates "0" while upon deviation indicates "1." Furthermore there is a bit address register LB which in case of an inequality upon comparison between two 16-digit binary words indicates the digit position for, e.g., the lowest digit position in which an inequality has occurred.

A further essential part of the central unit is the control unit SE which determines the transferring of the information between the different registers, in other words the microprogram which for every information word, by means of fixed connections, is determined in the control unit. This unit has an order register OR into which an order is written from the instruction register IR. The control unit decodes the binary word which has been written to the order register, in which binary word, e.g., four bits indicate 16 possible operations, so that one of 16 conductors is activated, compare FIG. 3. The conductor selected in this way determines, together with a number of conductors which are activated sequentially, the feeding in and feeding out of information to and from the registers and the logic operations to be performed by the logical unit respectively, as it will be described below in connection with an example. All the registers can be connected to a common 16-wire conductor (transfer bus) which in FIG. 2 is symbolized by one single conductor, over and-circuits OK1–OK22 the other input conditions of which are determined by the outputs of the control unit SE. As mentioned above the selected outputs are activated sequentially so that sequentially at least two and-circuits are opened simultaneously to make possible, on the one hand the feeding out of a 16-digit binary word to the common conductors, and on the other hand the feeding of this word to the one of the registers whose input circuit is open. As indicated in FIG. 2 part of the registers have both input and output gates through which access to the registers shall take place while part of the registers are supplied with only input gates from the common 16-wire conductor, as their contents are not fed directly to the common conductors. The function of the control unit SE and the whole simplified computer is easiest to understand in connection with an elementary operation carried out by the computer when it solves a task occurring in connection with the control of an automatic telephone exchange.

One of the many tasks which occur in a telephone plant is to establish whether a change in the state of a definite subscribers' line has taken place, i.e., that a subscriber which upon the last test of the state was found to be idle is now occupied or that he has become idle after earlier having been occupied. As it has been pointed out in connection with the transfer unit FE the sensing of the state of the subscribers' lines occurs in groups of 16 subscribers so that a 16-digit binary word is obtained in which to each of the 16 subscribers in the group belongs a binary digit 0 or 1 depending on their idle or occupied state, respectively. Selection of a 16-group takes place by means of an address written in the address register FA of the transfer unit FE. The sensing of the state of the subscribers' lines occurs cyclically with intervals of, e.g., 300 ms. and the result is written into the data memory DM on the address associated with the respective 16-group, so that the information concerning the last sensing is always stored in the data memory. To establish whether any change in the line state has occurred, a comparison must be carried out between the result obtained in the transfer unit by means of a definite address and the information being found on the corresponding address in the data memory. This comparison can be expressed in the following way: compare the content of register FR with the content of register DR. As it will be explained later the last stage in every operation implies that the next instruction is written into the order register register OR. It is assumed that the instruction written in OR prescribes a comparison between the contents of unit FE and unit DM on an address indicated by the writing order. FIG. 3 shows diagrammatically the control unit SE together with the order register OR into which the instruction order is written in code form. By way of example the first four bits of the characters indicate one of 16 possible operations (the comparison operation corresponding to the code 0100, i.e. 2), the digit positions 5–8 from the left indicate the code 1001, i.e. 9 for the register DR in which one of the operands is to be found according to the embodiment, the digit positions 9–12 from the left indicate the code 1011, i.e. 11 for the register FR in which the other operand is to be found according to the embodiment. According to the made simplification the digit positions 13–16 indicate the address of the 16-group of subscribers to be tested and which, according to the example, has been assumed to have the address 7. In reality the order register contains only the address of that one of the registers in the logical unit, which in its turn contains the 16 bits address of the respective 16-group of subscribers. Thus the instruction word is written 0010 1001 1011 0111.

The control unit SE is provided with decoders AVK1, AVK2 and AVK3 each one with four inputs and 16 outputs with only one being activated in every decoder: the output No. 2 of the decoder AVK1 indicating that the operation is a comparison, the output No. 9 of the decoder AVK2 indicating that it concerns the register DR with the code No. 9 and the output of No. 11 of the decoder AVK3 indicating that it concerns the register FR with the code No. 11. By EK is indicated a stepping forward chain with a number of outputs which are activated sequentially one after the other and which together with the output No. 2 from the decoder AVK1 sequentially activate a number of and-circuits K1$b$, K2$b$, etc. These and-circuits determine, together with possible signals from the decoders AVK2 and AVK3 which of the and-circuits shall be opened so that the desired transfer of binary words from one register to another can take place and which arithmetic operations shall be carried out in logical unit LE. The first stage is that the instruction word from the order register shall be transferred to address register DA as well as to address FA. This can be expressed as (DA)=(OR) and (FA)=(OR) respectively and takes place in order to make it possible that the digit positions 13–16 from the left can be used as an address for the subscriber's group to be examined. The gates OK22 OK13 and OK19 are opened and simultaneously reading out takes place in unit FE as well as in memory DM, so that the state record concerning the intended subscribers' group with the address 7 (0111) is written into register FR as well as into DR. This is carried out by activating the conductor $h1b$ in FIG. 3. The next stage is the transport of the contents of register DR to the register AA in order to prepare the comparison operation by opening the gates OK9 and OK12. This occurs by means of an and-circuit K$a$ the activating of which depends on the fact that it receives a signal from the conductor $h2b$ of the stepping forward chain EK as well as from the conductor $v9a$ of the decoder AVK2 (corresponding to the code number 9 for the register DR). This can be written: (AA)=(DR). Then the contents of register FR is transferred to register AR, which can be written: (AR)=(FR). For this purpose the gates OK18 and OK14 must be opened and this occurs by means of an and-circuit K$b$ which is activated depnding on simultaneously appearing signals on the conductor $h3b$ and the conductor $v11b$ of the decoder AVK3 (corresponding to the code number 11 for register FR). The next stage is a comparison between the contents of register AA and register AR, which is controlled by the next stage of the chain EK via the conductor $h4b$ in such a way that an input I$n$3 of the logical unit LE, which controls the comparison function, is activated.

The logical unit is of a type known per se in which the two operands are fed in the form of 16 digit binary words to the registers AA and AR. These registers differ in that in the first mentioned one every newly entered word erases the already recorded word while in the last mentioned register every newly entered word is added to the already recorded word in the register. In register AR both feeding in and feeding out of the existing word in the register can take place while the register AA only is intended for feeding in from and not for feeding out to other means. By activating the different inputs I$n$1, I$n$2, I$n$3 by means of signals from the control unit SE different operations are controlled. By activating, e.g., the input I$n$1 the digit 1 is added to the binary word written in the register AA and the result is written in the register AR. By activating the input I$n$2 the contents of AA and AR are added and the result is written in register AR. If the input I$n$3 is activated, a logical comparison takes place between the contents of registers AA and AR and if any difference in any of the binary character elements exists "1" is indicated by an indicating flip-flop SEF and upon identity between all the character elements "0" is indicated by the flip-flop. The address of the character element with, e.g., the lowest digit position in which deviation has been found, is indicated simultaneously by means of a bit address register LB which has four digit positions and consequently can indicate one of the 16 digit positions.

If upon the above mentioned comparison between the contents of registers AA and AR a deviation has been found in any of the digit positions this is indicated by the "1"-position of the indicating flip-flop SEF. If there is no deviation the flip-flop is in the "0"-position. For the next step of the stepping forward chain, when this activates the conductor $h5b$, there are two alternatives (compare FIG. 3) and the next instruction can be fetched from two different places: if a deviation has been found, i.e. the comparison result from flip-flop SEF is "1," the address of the next instruction will be the following in the sequence. The address of the instruction just carried out is stored in the register RC (the reason for this will be understood from the continued operation) and this address must be increased by one. First the gates OK21 and OK12 are opened in order to carry out a transfer of the contents of register RC to register AA, which takes place during the next stage of the stepping forward chain EK by activating the conductor $h6b$. Thereafter the conductor $h7b$ is activated in order to activate the input I$n$1 of the logical unit LE and add one to the contents of register AA and the result is stored in register AR. From register AR the new address is transferred to register RC for storing by activating the conductor $h8b$ and the gates OK15 and OK20 are opened. From register RC the new instruction address is transferred to address register IA by opening the gates OK21 and OK7 and reading out takes place, the instruction with the indicated address being transferred to register IR. Then the gates OK2 and OK16 are opened so that the instruction is transferred to register OR, thus the instruction written earlier in register OR is erased, the stepping forward chain EK is restored to its initial position and a new operation can begin. Thus the position corresponds to the initial stage of the operation just described: on the one hand the instruction is written in the order register OR, and on the other hand the instruction address is written in the register RC.

The new instruction written in the order register is a consequence of the fact that a deviation has been found upon comparison and can imply, e.g., that a connecting process to the respective subscriber's equipment is to be initiated. If, on the other hand, no deviation has been found upon comparison and flip-flop SEF indicates 0, another instruction must be carried out implying that, e.g., the 16-group of subscribers which is the following in the sequence, is to be tested. The address of the tested subscriber's group was written in the digit positions 13–16 from the left. This address must now be increased by one to obtain the address of the following subscriber's group. As a consequence of the fact that flip-flop SEF indicates "0" a current path is activated which, in the same way as described in connection with the first alternative, together with the outputs of the stepping forward chain activates the and-circuits K6$c$, K7$c$, etc. (compare FIG. 3) so that signals are obtained sequentially on the outputs $h6c$, $h7c$, etc. In order to calculate the new address the contents of the order register OR must first be transferred to register AA and this is obtained by opening the gates OK22 and OK12. During the next stage one is added in unit LE to the address part of the word recorded in register AA, i.e. the digit positions 13–16, which occurs by activating a special input I$n$5 of the logical unit. In regard to the fact that it is the same instruction which continues with the only difference that the address existing in the instruction word has been increased by one it is not necessary to use the instruction memory IM but the contents of the result register AR can be transferred directly to the order register OR, which takes place by opening the gates OK15 and OK16 by means of the conductor h8c. In this way the same situation has occurred as when the previous instruction was initiated, the stepping forward chain is set to zero and its outputs start again sequentially to activate the conductors h1b, h2b, etc. until equality or inequality has been found between the present and the earlier recorded state of the selected subscriber's group.

As a next step to illustrate the function of the arrangement a switching process is briefly described in which all the calculation units D1–D3 and data memories DM1–DM3 of the arrangement cooperate with each other. The described operation constitutes only a part of the whole operation of the establishing of a telephone call since the whole operation would be too complicated to describe and would not appreciably contribute to the understanding of the function. As already mentioned the incoming telephone lines are divided up into 16-groups which are continuously sensed, and a comparison takes place between the 16-digit binary word which represents the momentary state of the line group and the 16-digit binary word which represents the earlier state of the line group which is written in the data memory. It is assumed that this task is carried out by the calculation unit D1 which together with the data memory DM1 forms a computer for carrying out this task. Such a computer works in the same way as described in connection with the FIGS. 2 and 3. At first, there is sent from the order register OR of the central unit CE in the calculation unit D1 the address indicating the 16-group of subscribers to be tested to the address register FA of the transfer unit FE1. The mentioned address transfer takes place on one hand from the calculation unit D1A to the transfer unit FE1A by operating the contact 3/1, and on the other hand from the calculation unit D1B to the transfer unit FE1B by operating the contact 4/2 since, as mentioned earlier, all the units are doubled and work in parallel. For the sake of simplicity only the function of the calculation units D1A, D2A, D3A, the data memories DM1A, DM2A, DM3A and the transfer units FE1A, FE2A, FE3A will be described. The address written in the address register FA is decoded in the decoder AO of the transfer unit FE1 to cause the line test unit LT (whose task is to sense physically the voltage state of all the 16-groups of conductors and to represent these in the form of readable 16-digit binary words) to select the 16-digit word corresponding to the actual subscribers' group for transfer to the result register FR. In the mentioned word a closed subscribers' loop is represented, e.g., by 1 while an open subscribers' loop is represented by 0. Simultaneously with the sending of the address to transfer unit FE1 it is also sent to the address register DA of data memory DM1A over the contact 1/1 in consequence of which in data memory DM1A there is selected and transferred to register DR the 16-digit binary word which in binary form contains the state of the 16-group of subscribers in question according to the preceding sensing, as it has been described in connection with the FIGS. 2 and 3. The contents of register DR of data memory DM1A is transferred to the register AA of the central unit CE of calculating unit D1A by opening the contact 1/1 and the contents of register FR of transfer unit FE1A is transferred to the register AR in the same central unit by opening the contact 3/1. The values are compared in the logical unit LE and if they are equal the address is increased by one, thus carrying out a new operation identical with the preceding one. If, on the contrary, the contents of the two result registers DR and FR are found to be unequal several different possibilities arise: it is possible that a new call has been initiated, a call in progress has been terminated, or dialling is going on. In order to distinguish between these states further digit positions exist in the data memory DM1 by means of the contents of which digit positions the computer can calculate whether the actual conductor is connected or is in the state of dialling. For the sake of simplicity it is assumed in this case that it is the question about a new call not yet served, which implies that the subscriber shall be connected to an idle code receiver KM for receiving the digits sent from the subscribers' apparatus. The computer formed by the calculation unit D1A and the data memory DM1A is, according to the example, programmed in such a way that it selects a code receiver KM and selects an appropriate path between the subscribers' line and this code receiver over idle selectors in the switching network SLGV. In the data memory DM1A is written on one hand the occupied or idle state for all the code receivers and on the other hand the occupied or idle state for all the selectors. Furthermore there exists in the data memory DM1A an information about all the switching paths through the selectors over which a definite subscribers' line can be connected to a definite code receiver, and the computer comprising calculating unit D1A and data memory DM1A selects the first idle one of these switching paths. By means of this information which unambiguously determines the selection of paths through the selectors, the establishing of the connection between the calling line and the selected code receiver KM will take place. The establishing of the connection will occur by means of the computer formed by the calculation unit D2A and the data memory DM2A and for this purpose the information concerning the code receiver KM and the selectors is transferred over the contact 5/1 to the data memory DM2A which momentarily forms a computer with unit D1, after which the computer comprising units D1A–DM1A continues to sense the idle or unoccupied state of the lines, the selectors and the code receivers.

The computer comprising units D2A–DM2A whose task is to carry out the establishing of connections through the switching network SLGV arrives, during the carrying out of its instruction list, at an instruction which determines that the contents shall be read out from that field into which the computer comprising units D1A–DM1A writes the information concerning the selectors to be connected. This information is transferred from data memory DM2A to central unit CE of calculating unit D2A over the contact 5/3 and by means of this information the selectors will be set. For the sake of simplicity it is assumed that it is the transfer unit FE2 alone that carries out the connection of the selectors. The connection takes place by means of selector operating relay sets VMR which in their turn are operated by the fast relay operating unit SMR. The central unit CE of the computer comprising units D2A–DM2A must consequently send on the one hand a 16-digit binary word to the transfer unit FE2A in order to select a 16-group of operating means one of which shall be activated to connect a selector, and on the other hand a 16-digit binary word in which in the digit position corresponding to the selector to be connected, 1 is found while in the remaining digit positions 0 is found. The first mentioned function is carried out by transferring via the contact 7/3 to the address register FA the address of the respective 16-group in consequence of which via the address decoder AO a 16-group of operating means is selected in operating unit SMR. The last mentioned function is carried out in such a way that the word which contains the information stating which of the means within the 16-group has to be activated, is transferred to the result register FR, the contact 7/3 is opened after which a writing pulse is sent to the transfer unit FE2A (compare FIG. 2) and the operating means selected in unit SMR operates and connects the intended selector. This operation is of course repeated for every one of the selectors which is included in the switching path in consequence of which the switching path determined by the computer comprising units D2A–DM2A from the calling subscriber to the selected code receiver KM is established.

The code receiver shall be sensed so that digit receiving storing and digit analysis can take place. Correspondingly to the distribution of the work earlier mentioned this is carried out by the computer comprising units D3A–DM3A, in the data memory of which all digit information and all information which is necessary for the digit analysis is stored. For causing this computer to sence that a new operation shall be carried out from the moment of connection of a new code receiver KM, the number of the latter and the identity of the established connection must be transferred by means of the unit D2A to the data memory DM3A through the contact 9/3. In the data memory DM3A a special field is reserved for incoming information from memory DM2A. At a later time the calculation unit D3A will, through the contact 9/5, read out the information stored in the special field of memory DM3A after which the signally in the intended code receiver is initiated. The calculation unit D3A causes a sensing of the code receiver KM at regularly running intervals, e.g. every tenth millisecond, in order to find out whether digit information has been received or not. With the presumed simplified distribution of the work between the transfer units the mentioned sensing is carried out by means of the relay test units RT1 of the transfer unit FE3A and the information is transferred through the contact 11/5 to central unit CE of the unit D3A which carries out the reading of the digit signals and then stores the received digit in the memory DM3A through the contact 9/5. The received calling number is stored digit by digit in memory DM3A until the computer unit comprising units D3A–DM3A can establish whether the received digits are sufficient to determine the continued switching path. When this has occurred the computer comprising units D3A–DM3A sends its information to, e.g., the computer unit comprising units D1A–DM1A in order to select the continued switching path over idle selectors in the switching network SLGV. For this purpose the computer unit comprising units D3A–DM3A writes into a special field of memory DM1A the information which is necessary for the computer unit comprising units D1A–DM1A to carry out a path selection The function in this case is analogous with the function earlier described in connection with transferring of information between memories DM1A and DM2A and between memories DM2A and DM3A respectively.

In this phase the connection of the subscriber with the code receiver KM shall be disconnected after which the calling subscriber shall be connected to an idle connecting circuit SNR and from this the continued connection shall be set up towards the called subscriber if it was the question about a local call. If the called subscriber belongs to another exchange, the calling subscriber shall be connected to an outgoing repeater FUR after interruption of the connection with the code receiver, provided that no digit sending is needed to the following exchange. If on the contrary, digit sending to another exchange must take place, this is determined by the computer unit comprising units D3A–DM3A and also in which way the sending of digits shall take place after which a connection is set up between a code sender KS and an outgoing repeater FUR. Even in this case a request is transferred concerning the establishing of connection from the computer unit D3A–DM3A to the unit D1A–DM1A in order to carry out a path selection. In all the cases mentioned above the information concerning the selected idle switching path is transferred from the unit D1A–DM1A to the unit D2A–DM2A as it has been described earlier in connection with the establishing of a connection between the calling subscriber and the code receiver KM. If sending of digits to another exchange is concerned, i.e. if a code sender KS shall be connected to a repeater FUR, the information with respect to the identity of the connected code sender KS will be transferred from memory DM2A to memory DM3A. The selected code sender KS can now serve the connection in question by obtaining operation signals from the transfer unit FE3A in which the fast relay operation unit SMR is operated by means of the computer unit D3A–DM3A. When the digit signalling has been finished a signal is sent to the computer D2A–DM2A so that the connection through the switching network SLGV can be set up via repeater FUR to the outgoing line simultaneously with the disconnection of the connection between sender KS and repeater FUR.

The described operation is illustrated in the FIGS. 4a and 4b in which the telephone plant TA, the transfer units FE1, FE2, FE3 and the computer units D1–DM1, D2–DM2 and D3–DM3 are indicated in the form of blocks and the transfer of information between the different units is indicated by arrows carrying a number. The number is related to the following numbered functions. In FIG. 4a is indicated the operation of the connection of a subscriber to a code receiver and the establishing of a local call with the guidance of the digit information sent from the calling subscriber:

(1) Sensing of subscriber's calls (D1–FE1).
(2) Selection of an idle code receiver (D1–DM1).
(3) Selection of an idle switching path to the selected code receiver (D1–DM1).
(4) Transfer of the information concerning the idle switching path to the code receiver (D1–DM2).
(5) Connection of the selected switching path to the code receiver (DM2–D2–FE2).
(6) Transfer of information concerning the identity of the connected code receiver (D2–DM3).
(7) Sensing of the digit signals and storing (FE3–D3–DM3).
(8) Transfer of information concerning the switching path interpreted by means of the digit signals (D3–DM1).
(9) Disconnection of the code receiver (DM3–D2–FE2).
(10) Selection of an idle switching path to a connecting circuit relay set (D1–DM1).
(11) Transfer of information concerning the selected switching path (D1–DM2).
(12) Establishing of the connection of the selected switching path to the connecting circuit relay set or FUR (DM2–D2–FE2).

FIG. 4b shows the operation of the establishing of a call to another exchange involving the sending of digit signals. The paragraphs 1–7 coincide with FIG. 4a.

(18) Transfer of information implying that a code sender shall be selected (D3–DM1).
(19) Selection of an idle code sender and of an idle FUR connectable to this code sender (D1–DM1).
(20) Transfer of the information concerning the switching path between KS and FUR (D1–DM2).
(21) Connection of the code sender to FUR (DM2–D2–FE2).
(22) Transfer of information concerning the identity of the connected code sender (D2–DM3).
(23) Sending of digit information (DM3–D3–FE3).
(24) Sending of information implying that the digit sending over FUR is terminated (D3–DM1).
(25) Selection of a suitable switching path from the called subscriber to the same FUR (D1–DM1).
(26) Disconnection of the code sender (D1–DM2, DM2–D2–FE2).
(27) Transfer of information concerning the switching path between the subscriber and FUR (D1–DM2).
(28) Establishing of the connection between the called subscriber and FUR (DM2–D2–FE2).

As it is easy to understand practically every one of the calculation units D1, D2, D3 must have access to every one of the data memories DM1, DM2, DM3 and to the transfer units FE1, FE2, FE3 in order to write in and read out information. Considering that the calls to the data memories arrive at different times a queue handling system must be found which determines in which sequence the reading and writing instructions, respectively, from the respective calculation units shall be handled. This is indicated in FIG. 5 which shows the three calculation units D1–D3 and only one data memory DM1 and one transfer unit FE1 for the sake of simplicity. To the data memory DM1 belongs a number of address registers DA1, DA2, DA3 and a number of result registers DR1, DR2, DR3 in correspondence with every one of the calculation units D1–D3 and even the transfer unit FE1 has three address registers FA1, FA2, FA3 and three result registers FR1, FR2, FR3. The units DM2, DM3, FE2, FE3 which are not indicated in the figure for the sake of simplicity also have three address registers and three result registers. Every one of these registers are, through and-circuits, e.g. OK13 (compare FIG. 2), connected to a 16-wire signal conductor belonging to a definite calculation unit. The address register DA1 is connected to e.g. the signal conductor SL1 belonging to the calculation unit D1 through an and-circuit OK13/1, the address register DA2 is connected to the signal conductor SL2 belonging to the calculation unit D2 through the and-circuit OK13/2, the address register DA3 is connected to the signal conductor SL3 belonging to the calculation unit D3, etc. Registers with identical index numbers, e.g. DA1, DR1 of the three data memories DM1–DM3, are connected to the same signal conductor, according to the example conductor SL1, etc. An information which from unit D1 is transferred to memory DM1 passes from the signal conductor SL1 through the and-circuit OK13/1 which is opened by the control unit SE of the unit D1 and the information is stored in register DA1. If, on the contrary, an information shall be transferred from unit D2 to memory DM1 it passes from the signal conductor SL2 through the and-circuit OK13/2 which is opened by the control unit SE of the unit D2 and the information is stored in register DA2, etc. In a similar way the result of reading out of memory DM1 is obtained from the result registers DR1, DR2 and DR3 respectively and can be transferred to the signal conductor of that one of the calculation units which shall use the read out result. This takes place in such a way that the corresponding and-circuit, e.g. OK9/2, if the result shall be transferred to the unit D2, is activated by the control unit SE of the calculation unit D2. The sequence in which the three registers, e.g. DA1, DA2, DA3 are dealt with is determined by means of a sequence governor TU of arbitrary, known type which sequentially and cyclically senses these registers and causes the result to be stored in the corresponding result registers DR1–DR3. If the data memory DM consists of, e.g., a ferrite memory with a definite cycle time of, e.g., two microseconds, a delay of four microseconds is needed in the most unfavourable case before the information is handled in order to clear the calling queue without confusion of the result. It is easy to see that FIG. 5 is equivalent to FIG. 2 but with the difference that naturally there is a signal conductor SLI–SLU for every unit D and the number of and-circuits OK8, OK9, etc. has increased in correspondence with the number of signal conductors in order to make it possible for information to be fed from every unit D to every unit DM and unit FE, respectively, and inversely.

The fundamental idea of the invention is to bring about a redistribution of the tasks in an arrangement of the above described type if the traffic conditions or faults should prevent certain program sections from being carried out within a time interval defined as normal. In a computer controlled telephone system the instruction list of the computer includes a great number of instructions in which different groups or sections concern the different operations which shall be carried out by the computer, e.g., sensing of the state of subscriber's lines, operation of selectors, storing of impulses, etc. If the computer should carry out the instructions concerning a certain type of function, e.g. sensing of subscribers, disregarding that the remaining operations, e.g. connection of selectors, digit impulse receiving etc., are waiting, the next operation would never be initiated or initiated only when no work concerning said certain type of function is found, e.g. when no call has been done. The operations which are to be carried out in a similar system, have, however, different degrees of urgency and are divided up into, e.g., three categories A, B and C the first mentioned of which has preference over the second and the second over the third as it will be explained in connection with FIG. 8. Furthermore every one of these categories includes a plurality of different operations which among themselves have the same priority. For the mentioned reason a supervisory program is necessary which determines on the one hand for how long a certain program section can go on, and on the other hand which priority level or which operation of this priority level shall continue after the conclusion of a program section. The supervisory program intervenes consequently, e.g., if an operation of lower priority level has been dealt with too long a time, it brings about storing of the tasks of the program section going on and starts a section with a higher priority level or determines that a section shall be completely omitted etc.

In an arrangement in which a plurality of computers serves a telecommunication system the conditions become more complicated in that the different computers divide up the operations among themselves. As earlier mentioned the instruction sequence for every computer in such a system can include all the instructions, i.e. all the program sections which are necessary in order to make it possible for one computer alone to serve the whole plant but every one of the computers carries out only a part of the tasks. For the mentioned reason the supervisory program which controls the programs of the individual computers includes only those sections which shall be carried out by the respective computer. The addresses of these program sections are recorded in a special field but they can be exchanged for other program sections in order to allow a rearrangement of the tasks between the different computer units. This takes place by means of a second supervisory program which to distinguish from the above mentioned program, the computer supervisory program, this is called system supervisory program. This will first be explained in general outline with the aid of FIG. 6. This figure shows two calculation units D1, D2 and two data memories DM1, DM2 which form computer units D1–DM1 and D2–DM2. Each one of the data memories has an indicating memory field IF in which information is recorded, e.g. in the form of 16-digit binary words concerning the address of the sections of the instruction sequence, which shall be carried out by the respective calculation units. To the calculation unit belongs a field KMO, suitably in the instruction memory IM this field which stores the computer supervisory program determines the initiation of the different program sections in the instruction sequence as it will be explained in connection with the FIGS. 7–9. After the conclusion of a section of the instruction sequence corresponding to an address word recorded in the indicating memory field IF, the next word is read out in field IF and with the guidance of this word the next instruction section is carried out until the whole field has been scanned. The computer supervisory program KMO will take care of, inter alia, not only that the program sections recorded in field IF are carried out in the recorded sequence but also that on the one hand only such sections in the instruction list are passed through in which work is found and on the other hand the sections are treated during a predetermined time period. This will appear from the FIGS. 7–9.

As long as the system functions normally, i.e. no fault appears in the circuits or the individual program sections generally are terminated within a time interval which is defined as normal, there is no reason for changing the working list recorded in the indicating field. It can occur, however, that the time intended for the handling of a definite program section is exceeded which is established by the computer supervisory program and a signal is obtained as it will be explained later on. A fault can be signalled even as a consequence of a deviation between the information found in the redundant computer units in a known way. These signals cause, according to the signification of the signal, the start of different program sections of a system supervisory program which, according to the example, is also recorded in a special field SMO in the instruction memory IM in order to remedy the fault. As indicated symbolically in FIG. 6 each one of the calculation units D1, D2 includes a field SMO for a system supervisory program and the calculation unit in which abnormal conditions are indicated can, by means of the system supervisory program, read out the indicating memory field IF, erase parts of this and carry out new recordings in order to change the subsections which shall be handled. The calculation unit can carry out these operations, not only in the indicating field IF with which it normally cooperates, but even in the indicating field of the other calculation unit. Upon the receiving of a fault signal or a signal which indicates abnormal working conditions the system supervisory program makes an analysis of the type of the fault possible so that at first hand the effect of the fault can be minimized. In the most simple case, e.g. momentary overload, it is possible, e.g., by means of the system supervisory program to erase one or more section addresses in the field IF of memory DM. In the case when the operating time of a job with a lower urgency grade is exceeded within a limit allowed by the programming, the system supervisory program does not need to function but passing to another task can take place by means of the computer supervisory program as it will be explained in connection with FIG. 9. The fault can, however, be of such a complicated type that it is no longer possible to eliminate the overload only by erasing a few unessential sections of the working list. On this case the system supervisory program accomplishes that such sections which not simply can be erased from the indicating field of an overloaded computer are erased but transferred to the working list of the indicating field of another computer which for the moment has capacity available. This will be explained more in detail in connection with FIGS. 11–13. It is even possible that the content of a data memory can be erased and transferred to a stand-by data memory in a similar way in the case a data memory is faulty.

FIG. 7 shows diagrammatically how the program of the computer, recorded in the instruction memory, is controlled. This occurs by means of the machine supervisory program recorded in a memory field KMO, and by means of a work list recorded in another memory field, herebelow called "indicating field." One or both of the fields KMO and IF can be located in the instruction memory IM or in the data memory DM and their positions have no importance from the point of view of function. For the sake of simplicity it is assumed that the whole system comprises only two calculation units D1 and D2, two instruction memories IM1 and IM2 and two data memories DM1 and DM2. Both instruction memories include all program sections necessary for the work of the telephone exchange but every calculation unit carries out only part of the whole program. This is indicated in FIG. 7 in such a way that every program section recorded in the instruction memory IM1 which program section is treated by the computer formed by the calculation unit D1 and the data memory DM1, has the index "1" while those sections which are treated by the calculation unit 2, have the index "2." The work list of the indicating field IF includes sequentially the addresses of those program sections of the instruction memory which are to be treated by a certain calculation unit. According to this example it has been assumed for the sake of simplicity that the addressses of all program sections which are to be treated by the calculation unit D1, are recorded in the indicating field IF1 although it also is possible that some of the addresses are recorded in the indicating field IF2.

In the indicating field IF1 the addresses of the different program sections in instruction memory IM are recorded in that numerical sequence in which they are to be treated by the calculation unit D1. If it is assumed that the address of a certain program section in instruction memory IM has been read out from indicating field IF1 at a definite moment, the handling of this program section will start according to the instructions recorded in the section. When the last instruction of the program section has been performed, the operation of the next program section will not continue but that section is selected as next whose address is next in the indicating field IF. The address of that word in the field IF which includes the address of the just concluded section is recorded in the field KMO1 which includes the machine supervisory program, so that after increasing this address by 1 the next section address in instruction field IF can be selected. This process will be elucidated in connection with FIG. 7 which also shows how a section is jumped over when there is no work in that section. In FIG. 7, for the sake of simplicity, no regard has been paid for the present to the fact that the work going on in a certain section must be interrupted periodically and be replaced by a section with a higher priority level if the traffic conditions make this necessary, as will be explained below in connection with FIG. 8 and it has been assumed that the work is controlled only by the work list in the indicating field IF.

In FIG. 7 the different processes, i.e. feeding in-and feeding out of information to and from the different memories, IF1, IM1 and KMO1 and to and from the central unit CE1 are indicated by arrows and every arrow is provided with a number indicating the order in which different stages succeed each other. As has been mentioned earlier the addresses of those sections in the instruction memory IM which are to be treated, are recorded in the indicating field IF1. It is presupposed that at a definite moment the central unit CE1 reads out the contents of the word W$f$3 in the indicating field IF1 which word indicates the address of section 3/1 in the instruction memory IM1 (the arrow 1). By means of this address the first word W$r$1 in the section 3/1 of instruction memory IM1 (2) will be read out. This first word W$r$1 indicates in its turn the address (3) of the first word W$k$1 in the field KMO of the supervisory program that is associated with the section 3/1. This word W$k$1 includes on the one hand the address of word W$f$3 in the indicating field, on the other hand an information concerning the priority level of section 3/1 and also the address of a priority level indicating word W$n$1 in field KMO which word includes information concerning the priority level of the preceding section. (The meaning of the expression "priority level" will be explained in connection with FIG. 8.) The word W$k$1 is read out for selection of the word W$n$1 (5) and is transferred to the central unit (4) to which also the contents of the word W$n$1 (6) is transferred in order to compare the priority level of the earlier treated section with the priority level of the present section. If they are equal, no change in the record in word W$n$1 will be necessary but the word W$p$1 in field KMO1 is selected (7$a$) into which word in an earlier phase has been written whether work exists in section 3/1. If the priority level information were different, first a change of the record in W$n$1 will be necessary (7$b$), besides the selection of the word W$p$1. In case the word W$p$1 upon the reading out (8) has indicated that there is work to carry out in the section 3/1, the next word W$r$2 in the instruction sequence in memory IM1 (9$a$) will be read out which word is a common instruction word in the instruction list of the computer. When this instruction is concluded the next instruction word Wr3 etc., (10a) will be read out until the last word Wrz is read out (11a) which indicates for the central unit CE1 that the instruction sequence in section 3/1 has been concluded. The central unit increases by "1" the address of the word Wk1 in field KMO1 and selects (12a) the word Wk2. As has been mentioned this word includes the address of the word Wf4 in the indicating field IF1 which word follows the last selected word Wf3. The word Wf4 indicates the address of the next section in the instruction memory that is to be treated. The word Wk2 is read out (13a) and by means of this word the word Wf4 (14a) will be selected. In a corresponding way as has occurred in the operation (2) now the first word Ws1 in the section 4/1 of the instruction memory (15a) will be selected. This word includes in its turn the address of the first word Wk2 which, in the supervisory program field, KMO1, is associated with the section 4/1. By reading out of the word Ws1, Wk2 word (16a) will be selected and then the process continues exactly in the same way as has been described in connection with stage (4)=(17a) and stage (5)=(18a).

Returning now to stage (8) it could have been possible that the word Wp1 upon the reading out indicated that there was no work in section 3/1. In this case the central unit adds "1" to the address of the word Wk1 in field KMO1 in order to select the next word Wk2 (9b) in field KMO1. This corresponds exactly to stage (16a) with the difference that in this case the whole section 3/1 in the instruction sequence has not been previously treated before passing to the next section but the section 3/1 has been jumped over as there is no work to carry out. The stage (10b) is identical with the stage (13a) and then the process continues in the manner described hereabove.

In case it would not be necessary to pay regard to the fact that different sections have different priority levels and that of these sections those with higher priority levels must be treated within a definite time, the above described program would be sufficient for controlling the work of the system. The detection of the condition of the different means included in the plant is carried out regularly with a certain periodicity and the detecting periods are to be so short that every change in condition is detected with certainty, i.e. that no change is lost. In view of, for example, impulse receiving relays the contacts of which accurately follow the changes in the incoming signals a detecting period must be relatively short, for example 10 milliseconds. On the other hand, there are means which do not need to be operated or their condition does not need to be detected so rapidly. When, e.g., setting selectors, a function period of 100 milliseconds can be fully satisfactory and for, for example, scanning of the subscribers' lines in order to detect their condition a period of 300 milliseconds can be fully satisfactory. These values are taken into consideration by programming of the computers which operate in, for example, three different priority levels which implies that functions with a short scanning time, i.e. higher priorities, are carried out first, while functions with lower priority must wait until all functions which have higher priority levels have been carried out.

FIG. 8 shows diagrammatically a timing diagram for the three levels in an arbitrarily chosen example. As can be seen, the time axis is divided into 10 millisecond intervals. The highest priority level A, in which, for example, test and control of means for the receiving and control of signals take place, starts unconditionally every tenth millisecond which implies that if the function associated wtih the level A is not completed during a 10 millisecond period the operating is continued during the next 10 millisecond period or periods, while the functions with priority level B or C must wait. Every time the function on the level A has been completed before the end of the 10 millisecond period, the priority level B is started which belongs to functions less important than those on the level A, for example connection and disconnection of switches or switching on and switching off of less important relays. In the same way, the priority level C must wait until the function on level B has been completed. The instant at which the levels B and C are started are determined on the one hand by the program and on the other hand by the traffic in the telephone exchange.

It appears from the above description that the function on the levels B and C must be interrupted when the function starts every tenth millisecond on the level A. To avoid loss of the information concerning the function which is going on at that very time when the level B or C is interrupted, the information at the moment of interruption must be stored which implies that all registers in the central unit must be emptied and their contents must be stored in such a way that, upon restarting the interrupted level, they can be restored immediately to the right positions in the central unit CE.

The processes associated with the clock controlled interruption and with the distribution of the work between the different priority levels are indicated in FIG. 9 which is similar to FIG. 7 and which in the same way shows an indicating field IF1, an instruction memory IM1, the field of the machine supervisory program KMO1 and the central unit CE1. The difference is that the processes associated with the detection of the indicating field IF1 by automatic routine are not indicated but only those processes which are associated with the interruption and the storing of the program proceeding when the level A is to be started, and those processes which control that not too long a time has passed after the treating of the sections with level B and level C, respectively. In spite of the fact that the level A has priority before the levels B and C elapsed, operation of the levels B and C should not wait too long after a time defined as an upper limit.

The clock controlled interrupting signal KL produces for example at every 10th millisecond an interruption of the work just going on and replaces it with a job having the priority level A. To allow the carrying out of an interruption also another condition must be fulfilled, viz. that a signal is obtained from the control unit SE of the central unit, implying that the microprogram just preceding has been concluded. This is necessary in order to avoid loss of the information allowing continuation of the interrupted program section. The clock controlled interrupting function is indicated by means of an and-circuit OK the one input signal of which consists of said clock controlled interrupting signal KL and the other input signal of which consists of said terminating signal from control unit SE.

The clock controlled interrupting signal from circuit OK selects (21) that word Wk3 in field KMO1 which (word) is associated with the section in memory IM1 just then being executed, in order to determine on which priority level the work is going on. The word Wk3 includes an information item concerning the priority level of its associated section as a definite section of the instruction memory always has a priority level A, B or C which is determined in advance. As will be explained below the addresses of the different sections are always placed in the indicating field IF in accordance with the priority level, the sections with the highest priority being first. The word Wk3 is read out in field KMO1 and is transferred (22) to the central unit CE where it will be analyzed in order to decide whether the work just going on has the level A, B or C. If it appears that the work going on has the priority level A (23a) this implies that an exceptional condition, for example overload, exists. Normally the work would have been concluded earlier than at the end of the 10 millisecond period as a certain portion of the 10 millisecond period must be available in order to make it possible to carry out also the functions on levels A and C. A signal (23a) is obtained the function of which will be explained below in connection with the removal of the faults and which—in case the exceptional condition has not been temporary—will necessitate a re-arranging of the program. If it appears that the work just going on has the priority level B (23b) or C (23c) the word Wk3 which includes the address of the word Wf3 in field IF1 and is found in field KMO1, is written into the fields of KMO1 (24) and (24c) respectively, serving for storing of the information of levels B and C. The word Wk3 must be stored as first word in the storing field B and the storing field C respectively in order to know when restarting the work in this section, to which section the stored information belongs. By reading out of the stored word Wk3 from the field B (25b) and from the field C (25c) respectively it will be decided if the contents in the register of the control unit shall be stored in the field B (26b) or in the field C (26c). The completing of the storing initiates (27b and 27c respectively) the selection of the word Wf1 in the field IF1 (28). Wf1 which is the first word in the work list of the field IF1 includes the address of the first section that has the priority level A. As has been mentioned the addresses of the respective sections are written into the work list in such a way that first the sections with priority level A occur, then the sections with priority level B and finally the sections with priority level C. Due to the fact that upon a clock controlled interruption first the word Wf1 (28) is read out, then the word Wf2, etc. in consecutive order, all functions with priority level A will be carried out before the turn comes to, for example, the word Wf3, which word indicates a section with the priority level B. If the programming is correct and no exceptional operation conditions occur the computers must be able to carry out all tasks in this way without requiring any means to wait more time than has been determined for the different priority levels. After the reading out of the word Wf1 (29) the operation will be continued in the same way as has been explained in connection with the stage (2).

It is however not sufficient to supervise the function of level A as it is essential that also the operations of the levels B and C are carried out within a definite time. It may namely happen that for example the level B cannot be completed before a new clock controlled interruption takes place and this is going on for a longer time implying that the work on level C cannot be started at all. A possibility of control is to count after how many clock controlled interruptions the level B has been changed to level A without level C having been handled, and to count respectively, after how many clock controlled interruptions the level C has not been concluded, the allowable number of said clock controlled interruptions being selected as to a definite number $k$. In order to make this control possible, in the field KMO1 of the machine supervisory program there is found a counting word Wtb for the level B and a counting word Wtc for the level C. Upon obtaining the clock controlled interrupting signal from circuit OK the counting word Wtb (31) is selected and is read out to the central unit CE (32) where the word is examined to determine whether it is equal to the allowable number $k$. If the word is less, 1 will be added and written into the counting word Wtb (33), if it is equal, a fault indicating signal (33b) will be be obtained for allowing the removal of the fault. The counting word must of course be set to "0" if after a certain number of clock controlled interrupting signals a change from level B to level C has taken place. This is indicated by the arrow (7c) which refers to FIG. 7. In said figure it is indicated that, upon an examination whether the priority level has been changed relatively to the preceding work section (7b), the central unit also examines if the change has occurred from level B to level C, in which case a signal (7c) will be obtained. This signal causes 0-setting of the counting word Wtb before the number of clock controlled interruptions has reached the critical number $k$, i.e. the counting can be started again.

The process of controlling if the work on level C has been concluded before a definite number $k$ of clock controlled interruptions have occurred, differs somewhat from the process described hereabove. Also, here, the clock controlled interrupting signal (41) selects the counting word Wtc and this word is read out (42) to the central unit CE where a comparison takes place in order to determine whether the number of the counting word is less or equal to $k$. If the number is less, 1 will be added and put into the counting word Wtc (43b), if, however, the number is equal to $k$, a fault (43a) will be signalled. The removal of this fault will be described below. The control that all sections with priority level C have been executed is carried out in such a way that after the address of the last section with level C the word FFFF is written in the work list of field IF1 which word is the maximum value that can be expressed by a 16-digit binary word. In view of the fact that the reading out of all addresses in field IF1 occurs sequentially it will be the word FFFF that comes up upon the treating of the last section wtih level C. Thus upon the reading out of each word in field IF1 a comparison takes place in the central unit (2a) in order to determine whether the word read out is FFFF. If it is not equal to FFFF no measure will be taken, if it is equal, on the other hand, the counting word (3a) will be set to 0 which implies that the work on the level C has been completed without reaching the critical number of clock controlled interruptions. Thus in the manner described hereabove a fault indicating signal will be obtained not only when the function associated with the level A is prolonged beyond the predetermined time but also when the level B and the level C respectively has not been completed within a determined time.

If it appears that the function on one of the levels has not been completed within the predetermined time, as a first step certain sections of the work list in field IF can be erased. The addresses of the different sections in the instruction sequence are also, within the same priority level, recorded in a certain priority sequence, the supervisory information, for example a routine test, being the last in the sequence. Suitably each section has an absolute sequence number according to which its address is placed in the work list. When it has been settled that the completing of the work on a certain level has not been carried out within a predetermined time, first the section address being the last on the list will be erased, i.e. for example the supervisory functions, in order to cause a decrease of the load until the eventual disturbance which prevented completing of the work ceases. This is shown diagrammatically for the level B with reference to FIG. 10 but there is no essential difference if the fault indicating signal indicates that on some other level, for example the level A or C, it has not been possible to complete the work within the predetermined time.

The signal which indicates that the work on level B has not been completed (33a) (FIG. 9) starts the system supervisory program recorded in the field SMO. The address of the last word Wf5 which is associated with the level B in the indicating field IF and which address is recorded in the word Wx in field SMO, is read out (50) and by means of said address the word Wf5 in field IF is read out (51). The address of the word Wf5 indicates (52) the first instruction Wr1 in section 5/1 in memory IM as has been explained in connection with FIGS. 7 and 9 and this instruction selects (53) the work word Wp1 in field KMO. The work word indicates (54) if there is work going on in the section as has been explained in connection with FIG. 7. If there is work going on in the section according to the work word Wp1, 0 will be written (55a) which implies that in the continuation this section will be jumped over and a new control will be started to determine whether, after the erasing of this section, the work handling capacity has increased. To be able to carry out this new control the counting word Wtb (compare FIG. 9) must be 0-set after having written "0" (56a) (57a) into the work word Wp1. Simultaneously with the writing of 0 into the work word a new record will also be made in the word W$f$5 of field IF implying that the section 5/1 for the present has been erased (55a). This record is used as will be explained in connection with FIG. 13 for determining which tasks are to be transferred to another computer if the fault cannot be removed by simply erasing the least essential sections.

If there was no work to carry out according to the word W$p$1 the next section (from below upwards) must be erased in the indicating field IF. First however must it be ascertained (55b) whether this section may be erased at all. It is presupposed that after the erasing of the sections that include only supervisory functions, further erasings must not be carried out and this is controlled in such a way that the sequence number of the word W$f$ which is selected next time (the selection is carried out from higher numbers towards lower ones) is compared with a definite number $n$. When thus it has been established that no work was recorded in the work word W$p$1 (55b), 1 will be subtracted from the address of the last selected word W$x$ in field SMO. If the sequence number of the word W$f$, corresponding to the address obtained, is equal to $n$ (for example W$f$4 is reached, $n=4$) this means that the fault is of such a character that other measures should be taken (101) as will be explained in connection with FIG. 13. If, on the other hand, the sequence number of the word W$f$ is larger than $n$, one more section can be erased and the next word $W_{x-1}$ in field SMO is selected (56b). Reading out of this word (57b) determines the word W$f$4 (58) in field IF which word indicates the address of the next section in memory IM (59) after which the process proceeds in the same way as has been described in connection with stage (52) until 0 has been written into the work word and a new control can be carried out in order to establish whether the erasing of the last section has made possible the completing of the whole work on level B.

The faults of different types which have been established according to the above can be removed by means of the field SMO of the system supervisory program as will be explained by means of some examples. As has been mentioned in the introduction the faults can be divided into substantially two categories. In one category the type of the fault appears directly from a fault indicating signal that indicates that, for example, a calculating unit or a data memory has become faulty and in the other category a signal indicates that the work cannot be concluded within a definite time due to overload (which in its turn also can be dependent on a circuit fault in one of the units). In connection with FIG. 11 that case will be described when the whole calculating unit becomes faulty and the work list from the indicating field IF1 cooperating with this unit must be transferred to another indicating field IF2. In connection with FIG. 12 that case will be described when the data memory of a computer becomes faulty and its entire contents must be transferred to a stand-by data memory. In connection with FIG. 13 that case will be described when the function of one or more sections is transferred from the indicating field IF1 of the one computer to the indicating field IF2 of the other computer in order to decrease the load of the first mentioned computer when it is not able to complete the work on a certain level (compare FIG. 10).

In connection with FIG. 11 that case is elucidated when a calculating unit consisting of central unit CE1 and memory IM1 or a computer consisting of a calculating unit and a data memory DM1 associated with it, becomes faulty.

The comparison circuit JK that always compares the calculation result of the redundant computers sends a fault indicating signal implying that the function of the whole computer is to be taken over by another computer. This occurs in such a way that the work list of the indicating field IF1 of the faulty computer must be transferred to the indicating field IF2 of reliable computer CE2, IM2, DM2 to allow said reliable computer to take over the work of the faulty computer. This is a simplification in comparison with the practical conditions in order to make the function more comprehensible because in practice a dividing up of the work of the faulty computer between two or more computers must take place. The process will however fundamentally be the same irrespectively of whether the transfer of the work of the faulty computer is made to one or more computers.

In FIG. 11 are indicated diagrammatically the central unit CE1, the instruction memory IM1, the data memory DM1, the indicating field IF1 and the field of the system supervisory program SMO1 of the faulty computer and the central unit CE2, the instruction memory IM2, the data memory DM2, the indicating field IF2 and the field of the system supervisory program SMO2 of the reliable computer which will take over the function of the faulty computer. As has been explained in the introduction an identical system supervisory program is stored in each computer. A fault of such a type in one of the computers, which can be removed without involving any other computer, makes use of the system supervisory program recorded in the same computer, as has been shown in connection with FIG. 10. If on the other hand the cooperation of another computer is necessary for decreasing the load of a computer functioning in a faulty way or for taking over its work completely, the system supervisory program recorded in said other computer will be used.

From a comparison circuit JK that constantly compares the calculation result of the units included in a redundant unit, a signal will be obtained which indicates that a fault is of such type that the whole work is to be taken over by other computers (61). The signal is transformed into a code word in the central unit CE2 of the reliable computer to make it possible to ascertain, by making a comparison with different code words corresponding to different types of faults, which type of fault has occurred. The words corresponding to the different faults are recorded in the field SMO2 of the system supervisory program and the first of these fault indicating words having number 1 is selected (62). The fault indicating word is read out (63) and a comparison is made with the code word obtained from the fault indicating signal. If there is no equality the next fault indicating word in the system supervisory program SMO2 (64b) will be read out and a new comparison with the code word is made. If an equality has been found, the first word in the fault removing program in SMO2, corresponding to the fault, will be selected (64a). Upon the occurrence of a fault described in connection with FIG. 11 the work list of the faulty computer in field IF1 must be transferred to the work list of the reliable computer in field IF2 in such a way that in the final work list the addresses of the different sections are placed in priority sequence and in accordance to the sequence number which each section in the whole system has obtained. To make it possible to carry out such a re-sorting, the words from its own field IF as well as from the extraneous field IF must be read out and after a re-sorting they must be rewritten into the indicating field IF2. The fault removing word is read out (65) and it indicates that the content of field IF2 is to be copied into the field SMO2. The first word in field IF2 is selected (66) and is stored in field SMO2 (67). Then a comparison takes place for ascertaining whether it was the last word that has been transferred from field IF2 (68). As has been explained in connection with FIG. 7 the work list of field IF2 is concluded with the word FFFF which indicates that the last word has been reached. If the address is not FFFF, "1" will be added to the address and the next word is selected in field IF2 (69b). If on the other hand the address has turned out to be FFFF (69a) this means that the transfer of the work list from the field IF2 is completed and a field into which an extraneous work list from field IF1 can be copied, is selected. Then a copying of the field IF1 is carried out in which the first word will be selected (71) and transferred (72) to the field in field SMO2, intended for this purpose. The same process is repeated as upon the copying of the work list, i.e. a comparison is made whether the address is equal to FFFF or not (73). If the address is not equal to FFFF, "1" will be added to the address and the process continues (74b). If, on the other hand, it is equal to FFFF, this means that the copying is finished and the re-arranging can start (74a) with the first section address in the self field IF which according to the example has the level A. The word is read out (75) and is stored in a common storing field in field SMO2 (76). Then "1" will be added (77) to the address of the read out section address and by means of the new address the next section address (78) will be selected and an examination is carried out whether this section address corresponds to a section with the same level as the preceding one (79). If the level is unchanged, i.e. A, the word will be written into the common storing field (80a), i.e. the process will be identical with (76). If, on the other hand, the level has been changed to level B, this implies that first the section addresses of the extraneous field IF, associated with level A, must be put into the common storing field so that the first word in the storing field of field IF1 is searched (80b), is read out (81) and is written into the common storing field (82). Then "1" will be added to the address and the next word is searched in the storing field of field IF1 (84). The word is read out (85) to determine whether it is equal to FFFF. In this case this should imply that the last word in field IF1 has been reached, i.e. all section addresses are placed in the storing field correspondingly to their priority levels and the reading out of the common storing field can start (86a), the section addresses being copied over to field IF2 in the new numerical sequence as is indicated by (88) on the right side of field IF2 (the left side shows the same field before the work of the other computer has been taken over). If the last word has not yet been reached, i.e. the word readout is not equal to FFFF, it is to be determined whether the read out section address is associated with the same priority level or not. If the priority level is unchanged, the writing into the common storing field (86c) will take place and then the process continues as according to (83). If, however, it has appeared that the level of the next section address has been changed, e.g. the next section as the level B, first the section address with level B must be read out from field IF2 (86b) and then the process continues as under (79).

A fault of another type is when a fault arises in one of the memories of a data memory pair DMa–DMb and all information in the data memory pair is to be transferred to a stand-by data memory or stand-by data memory pair. This is indicated in FIG. 12 where for the sake of simplicity only one of the memories of the memory pair is shown in the faulty data memory pair as well as in the stand-by data memory pair. In a corresponding way as in FIG. 11 are indicated the central unit CE2, the instruction memory IM2, the field SMO2 of the system supervisory program and also the data memory DM2 of a reliable computer and the stand-by data memory DMr. Upon the occurrence of a fault in one of the data memories of a data memory pair their will be obtained, in consequence of the result deviation in the redundant unit, a signal from the comparison circuit JK to that one of the computers which is intended to carry out the copying of the information into the stand-by data memory (91). In the same way as has been explained in connection with FIG. 11 the fault indicating signal is translated into a code word after which the fault indicating words in field SMO2 will be read out (92) and compared (93) with the fault code words sequentially one after another. If no equality has been found, the next fault indicating word (94b) will be selected until finally equality has been found. If on the other hand equality has been found, the first word in the fault removing program (94a), corresponding to the fault discovered, i.e. a fault in the data memory, will be selected. The instruction implies copying of the content of memory DM into memory DMr (95) which implies that all words in memory DM, beginning with the first word, are selected (96), read out (97) and written into (98) the corresponding address in memory DMr. After each copying, a comparison (99) takes place in order to ascertain whether the last word has been reached, which word is FFFF. If the word transferred has been equal to FFFF this implies that the whole data memory has been transferred (100b) and the computer can proceed to another process. If, on the other hand, the word has not been equal to FFFF, "1" will be added to the address in memory DM2 and the next word is read out (100a) after which the process will be identical with the process indicated by (97). Said copying does not need to take place with the highest priority but can be carried out in the time between two clock controlled interruptions in which, for example, the function associated with the level B has been completed.

FIG. 13 shows how a fault is removed by transferring the tasks from one computer to another in case it should appear that it is not possible to conclude the tasks in spite of the fact that all erasable work sections already have been erased as has been explained in the example referring to level B (FIG. 10). In said example it has been assumed that in case the number or erased sections is equal to a definite number n, special measures must be taken which is indicated by the arrow (101). These measures will be explained in connection with FIG. 13. The computer from which the fault indicating signal is obtained is symbolized by the central unit CE1 from which the fault indicating signal (101) is obtained. The fault indicating signal is transformed into a code word after which the reading out of the different fault indicating words is carried out (102) in the same way as according to FIGS. 11 and 12; the fault indicating word is compared with the fault code (103) and in case no equality is found, the next fault indicating word (104b) will be selected until equality has been found. If equality has been found the first word in the fault removing program (104a) will be selected, This word includes an instruction implying that the first section address on level B in field IF1, i.e. in the indicating field of the defectively working computer, is to be selected (106). It is namely presupposed that the signal (101) indicates that the work of the computer comprising units D1–DM1 is not satisfactory on the level B (compare FIG. 10). As has been explained in connection with FIG. 10 each word in field IF1 includes an item of information in a particular digit position in the form of a work bit that indicates whether the respective section has been erased in connection with the attempt to decrease the load. The word Wf is read out (107) and it is ascertained whether its work bit is 0 which means that the word has been set to 0, or is 1. If the work bit is 1, 1 will be added to the selection address (108a) and the next word Wf is read out in field IF1, the process being the same as (107). If on the other hand a word with the work bit 0 has been found, this means that this was the last section address that has been erased in connection with the earlier attempt to remove the fault. Thus it is necessary to subtract "1" from the address in order to select that word Wf (108b) which now is to be erased and transferred to the indicating field IF2 of the other computer, to make it possible to decrease thereby the load of the computer functioning in an unsatisfactory manner. It is assumed that the word which is to be transferred to field IF2, was Wf4. This word is stored (110) in a field in field SMO2, intended for this purpose and then the words Wf having the level B will be transferred from the own indicating field IF2 of the computer to field SMO2 so that the word read out from field IF1 should be placed among said words. The first word with level B in field IF2 is read out (112) and is written (113) into the storing field of field SMO2.

Now a comparison must be made to determine which of the two words shall be first. As has been mentioned earlier each section address in the indicating fields IF has a sequence number indicating the absolute numerical sequence among the different section addresses. In this way it will be determined which one of the two section addresses shall be placed first upon a re-sorting. This numerical sequence number is now to be read out (115) for the word IF1 stored in field SMO2 as well as for the word IF2 stored in field SMO2. If the comparison shows (116) that the absolute sequence number of the IF1 is lower than that of the word IF2 this implies that all words in IF2 beginning with the word IF2 onwards should be moved one stage downwards (117a) due to which an interspace is obtained for the word IF1 which has a lower absolute sequence number than said word. The stored word IF1 is read out (119) from field SMO2 and is written into the interspace (120). Owing to this the transferred section will now be treated by the computer comprising units CE2, DM2, IM2. The control of the previously overloaded computer continues in order to ascertain whether the transfer of a section has brought about the necessary decrease of the load. If this has not occurred, a new fault indicating signal will be obtained and the process described is repeated with the transfer of a new section from field IF1 to IF2. If it will appear (117b) that the transferred word IF1 has a higher absolute numerical sequence number than the first read out word IF2 having level B, 1 will be added to the address of IF2 selected before and the next section address is transferred to field SMO2, the process corresponding to that one indicated by (113).

The invention is not limited to the embodiments shown and a large number of operation problems can be solved according to the principle of the invention. The input and output means serving for the exchange of information between the computer and the outside world, for example a typewriter or a tape reader, can be disconnected by means of the system supervisory program. In addition, faulty transfer units or parts thereof can be disconnected.

We claim:

1. Control apparatus for controlling the operations of a system of interacting elements, said apparatus comprising a plurality of central processing units, a plurality of instruction memory units for storing instructions, and a plurality of working memory units for storing intermediate result data, means for controllably interconnecting each one of said central processing units, each one of said instruction memory units and each one of said working memory units whereby there are formed a plurality of computers at any instant of time, wherein each computer comprises at least one central processing unit, at least one instruction memory unit and at least one working memory unit, and wherein a unit of any one computer at one instant of time can be a part of another computer at a different instant of time and at least one transfer unit interfacing said system of interacting elements to said formed computers for receiving information from said elements to indicate the state thereof to said computers and to receive information from said computers for controlling the operations of said elements, the instruction memory unit of each of said computers storing in addressed registers the entire instruction sequence required to control the entire operation of said system of interconnected elements, means for assigning to each of said computers a definite job section of the entire instruction sequence whereby each computer normally performs only a part of the entire instruction sequence, the working memory unit of each said computers having an indicating program field means for storing the section starting address of the register in its associated instruction memory unit where the first instruction of its associated job section of the instruction sequence is located, and each of said instruction memory units including a program memory field of registers containing a supervisory program of instructions, and means included in each of said computers for receiving from said transfer unit information concerning the states of said interacting elements and, if the states are not in accordance with predetermined requirements, for activating said supervisory program to erase said section starting address stored in said indicating program field means and to transfer said section starting address to the indicating program field means of another of said computers.

2. The apparatus of claim 1 wherein the instruction memory unit of each of said computers includes priority means responsive to said supervisory program of instructions for determining whether the functions performed by said computer are accomplished in a given period of time, means in each of said computers responsive to the priority means thereof to rearrange the tasks performed by said computers by transferring the section starting addresses to different indicating program field means in the event the functions are not performed within said given period of time.

3. The apparatus of claim 1 wherein each of said computers comprises redundant pairs of central processing units, instruction memory units and working memory units and further comprises means for comparing the results of the operations of the units of each redundant pair of units to detect errors in the operations thereof, and means responsive to said comparing means to transfer the section starting address stored in both indicating program memory field means of the computer wherein an error in the operation thereof has been detected, to both indicating program memory field means of another computer.

References Cited

UNITED STATES PATENTS

| | | | |
|---|---|---|---|
| 3,312,947 | 4/1967 | Raspanti | 340—172.5 |
| 3,319,226 | 5/1967 | Mott et al. | 340—172.5 |
| 3,363,234 | 1/1968 | Erickson et al. | 340—172.5 |
| 3,374,465 | 3/1968 | Richmond et al. | 340—172.5 |
| 3,386,082 | 5/1968 | Stafford et al. | 340—172.5 |
| 3,200,380 | 8/1965 | MacDonald et al. | 340—172.5 |
| 3,312,954 | 4/1967 | Bible et al. | 340—172.5 |

PAUL J. HENON, Primary Examiner

H. E. SPRINGBORN, Assistant Examiner